(12) United States Patent
Wong et al.

(10) Patent No.: US 12,069,660 B2
(45) Date of Patent: Aug. 20, 2024

(54) INFRASTRUCTURE EQUIPMENT FOR DETERMINING WHETHER A COMMUNICATIONS DEVICE IS WITHIN A RADIO COVERAGE AREA

(71) Applicants: Sony Group Corporation, Tokyo (JP); Sony Mobile Communications Inc., Tokyo (JP)

(72) Inventors: Shin Horng Wong, Basingstoke (GB); Brian Alexander Martin, Basingstoke (GB); Martin Warwick Beale, Basingstoke (GB); Yuxin Wei, Basingstoke (GB); Anders Berggren, Lund (SE); Lars Nord, Lund (SE)

(73) Assignees: SONY GROUP CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 227 days.

(21) Appl. No.: 17/492,963

(22) Filed: Oct. 4, 2021

(65) Prior Publication Data
US 2022/0030578 A1    Jan. 27, 2022

Related U.S. Application Data

(63) Continuation of application No. 16/324,574, filed as application No. PCT/EP2017/069003 on Jul. 27, 2017, now Pat. No. 11,140,662.

(30) Foreign Application Priority Data

Aug. 11, 2016  (EP) .................................... 16183726

(51) Int. Cl.
*H04W 72/20* (2023.01)
*H04L 5/00* (2006.01)
(Continued)

(52) U.S. Cl.
CPC ............ *H04W 72/20* (2023.01); *H04L 5/0055* (2013.01); *H04W 72/23* (2023.01);
(Continued)

(58) Field of Classification Search
CPC . H04W 72/20; H04W 72/23; H04W 36/0033; H04W 74/0833; H04W 76/25; H04W 76/27; H04L 5/0055
See application file for complete search history.

(56) References Cited

U.S. PATENT DOCUMENTS

| 10,349,316 B2 | 7/2019 | Wang |
| 2012/0012793 A1 | 1/2012 | Liu et al. |

(Continued)

FOREIGN PATENT DOCUMENTS

| CN | 104602304 A | * | 5/2015 | |
| WO | 2013/144613 A1 | | 10/2013 | |
| WO | WO-2013144613 A1 | * | 10/2013 | ............ H04W 76/19 |

OTHER PUBLICATIONS

English translation of CN-104602304-A, 2015, retrieved from PE2E Search on Nov. 9, 2023. (Year: 2015).*

(Continued)

*Primary Examiner* — Omar J Ghowrwal
(74) *Attorney, Agent, or Firm* — XSENSUS LLP

(57) ABSTRACT

An infrastructure equipment that transmits a radio network identifier to a communications device for identifying the communications device when allocating communications resources of the wireless access interface for transmitting downlink data to the communications device. After the communications device has entered an inactive connected state, the infrastructure equipment transmits control signals including the radio network identifier for allocating communications resources of the wireless access interface for the communications device to receive downlink data, deter- (Continued)

Proposed NR RRC states mine whether the communications device is still within a radio coverage area of the infrastructure equipment, and if the communications device has left the coverage area, transmit an indication to the one or more other infrastructure equipment via the inter-connecting interface to trigger a process for transmitting downlink data to the communications device from the one or more other infrastructure equipment.

10 Claims, 12 Drawing Sheets

(51) Int. Cl.
  *H04W 72/23* (2023.01)
  *H04W 36/00* (2009.01)
  *H04W 74/0833* (2024.01)
  *H04W 76/25* (2018.01)
  *H04W 76/27* (2018.01)

(52) U.S. Cl.
  CPC .... *H04W 36/0033* (2013.01); *H04W 74/0833* (2013.01); *H04W 76/25* (2018.02); *H04W 76/27* (2018.02)

(56) References Cited

U.S. PATENT DOCUMENTS

| | | |
|---|---|---|
| 2013/0301611 A1 | 11/2013 | Baghel et al. |
| 2014/0126489 A1 | 5/2014 | Zakrzewski |
| 2017/0099696 A1 | 4/2017 | Sakurai et al. |
| 2017/0171764 A1 | 6/2017 | Dimou et al. |

OTHER PUBLICATIONS

Intel Corporation, "Standalone NR: Discussion on mobility framework", 3GPP TSG RAN WG2 Meeting No. 94 R2-163582, Nanjing China, May 23-27, 2016, 6 pages.
Huawei, Hisilicon, "Evaluation on RAN initiated paging and MME initiated paging", 3GPP TSG-RAN WG2 Meeting No. 94 R2-163930, Nanjing China, May 23-27, 2016, 12 pages.
Ericsson, "Handling of inactive UEs", 3GPP TSG-RAN WG2 #94 Tdoc R2-163998, Nanjing P.R.China, May 23-27, 2016, pp. 1-6.
Huawei, Intel Corporation, China Telecom, "New WI proposal: Signalling reduction to enable light Connection for LTE", 3GPP TSG RAN Meeting No. 71 RP-160540, Gothenburg Sweden, Mar. 7-10, 2016, 7 pages.
NTT Docomo, "New SID Proposal: Study on New Radio Access Technology", 3GPP TSG RAN Meeting No. 71 RP-160671, Goteborg Sweden, Mar. 7-10, 2016, 8 pages.
Holma et al. "LTE for UMTS OFDMA and SC-FDMA Based Radio Access", John Wiley & Sons LTD, 2009, 11 pages.
3GPP, "LTE; Evolved Universal Terrestrial Radio Access (E-UTRA); Medium Access Control (MAC) Protocol Specification", TS 36.321 Version 12.5.0 Release 12, Apr. 2015, 79 pages.
Ericsson, "RRC Connection Suspend and Resume", 3GPP TSG-RAN WG2 NB-IoT Ad-hoc Meeting Tdoc R2-160475, Budapest Hungary, Jan. 19-21, 2016, pp. 1-14.
International Search Report mailed on Oct. 25, 2017 for PCT/EP2017/069003 filed on Jul. 27, 2017, 17 pages.
Huawei et al: "Downlink latency reduction for unsynchronized UEs", 3GPP Draft; R2-156297 Downlink Latency Reduction for Unsynchronized Ues, vol. RAN WG2, No. Anaheim, USA; Nov. 16, 2015-Nov. 20, 2015, Nov. 16, 2015 (Nov. 16, 2015), XP051005780, Retrieved from the Internet: URL:http://www.3gpp.orgiftp/Meetings_3GPP_SYNCIRAN2IDocsI [retrieved on Nov. 16, 2015].
European Communication issued Apr. 8, 2020 in European Application No. 17749670.0.

* cited by examiner

LTE RRC states

Proposed NR RRC states

INFRASTRUCTURE EQUIPMENT FOR DETERMINING WHETHER A COMMUNICATIONS DEVICE IS WITHIN A RADIO COVERAGE AREA

CROSS-REFERENCE TO RELATED APPLICATIONS

This application is a continuation of U.S. patent application Ser. No. 16/324,574, filed Feb. 11, 2019, which is based on PCT filing PCT/EP2017/069003, filed Jul. 27, 2017, and claims priority to 16183726.5, filed in the European Patent Office on Aug. 11, 2016, the entire contents of each of which are being incorporated herein by reference.

TECHNICAL FIELD OF THE DISCLOSURE

The present disclosure relates to communications devices configured to receive downlink data from an infrastructure equipment of a wireless communications network, in which the communications device can enter an inactive connected state. The present disclosure also relates to methods of communicating using communications devices, wireless communications network, infrastructure equipment and methods.

BACKGROUND OF THE DISCLOSURE

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication devices, devices which require little or no mobility, high resolution video displays and virtual reality headsets. As such there is expected to be an increase in the variety of communications devices as well as the number of devices served by a cell. Indeed, the so-called internet-of-things envisages many low power or low cost devices being used in a cell served by a base station. As such new technical problems may occur.

If there are many communications devices being served by a base station in a cell, and a characteristic of the data being received by the devices is sporadic and represents the transmission of small amounts of data infrequently, then a technical challenge is presented in arranging for the downlink data to be received as efficiently as possible. The efficiency can be in respect of a power saving of the communications device between active periods of receiving downlink data and signalling overheads which are required to receive the downlink data.

SUMMARY OF THE DISCLOSURE

Embodiments of the present technique can provide an arrangement in which an infrastructure equipment forms part of a radio access network of a wireless communications network and comprises a transmitter configured to transmit signals to one or more communications devices via a wireless access interface, a receiver configured to receive signals from the one or more communications devices via the wireless access interface, an inter-connecting interface for communicating with one or more other infrastructure equipment of the radio access network of the wireless communications network, and a controller. The controller is configured with the transmitter to transmit a radio network identifier to a communications device, which is allocated by the infrastructure equipment for identifying the communications device when allocating communications resources of the wireless access interface for transmitting downlink data to the communications device. After the communications device has entered an inactive connected state, in which the communications device monitors for signals transmitted from the infrastructure equipment, the controller is configured with the transmitter to transmit control signals including the radio network identifier for allocating communications resources of the wireless access interface for the communications device to receive downlink data, to determine whether the communications device is still within a radio coverage area for transmitting signals to and receiving signals from the infrastructure equipment, and if the communications device has left the coverage area, to transmit an indication to the one or more other infrastructure equipment forming part of the radio access network via the inter-connecting interface to trigger a process for transmitting downlink data to the communications device from the one or more other infrastructure equipment.

Embodiments of the present technique can provide a radio access network which includes a plurality of infrastructure equipment, inter-connected to form a local tracking area or routing area. A communications device can enter into a connected-inactive state in which it monitors for downlink signals from an infrastructure equipment (base station) for which it has established a connection or other infrastructure equipment in the local tracking area. The infrastructure equipment can therefore transmit downlink data to the communications device, without requiring the communications device to perform a random access procedure and without having to acquire a radio network identifier, because this is retained after the communications device has entered the connected-inactive state. If the communications device has roamed to a different one of the infrastructure equipment outside of a coverage area of the infrastructure equipment for which it established a connection, then after detecting that the communications device has not responded, the infrastructure equipment can trigger one of the other infrastructure equipment in the local tracking or routing area to transmit the data.

Accordingly embodiments of the present technique can provide an advantage because the communications device can enter the connected-inactive state to save power but also receive data on the downlink without having to perform a random access procedure and without having to acquire a network identifier.

Various further aspects and embodiments of the disclosure are provided in the appended claims, including but not limited to, a communications device, infrastructure equipment, mobile communications system and a method of communicating.

BRIEF DESCRIPTION OF DRAWINGS

Embodiments of the present disclosure will now be described by way of example only with reference to the accompanying drawings in which like parts are provided with corresponding reference numerals and in which.

DESCRIPTION OF EXAMPLE EMBODIMENTS

Conventional LTE Network

Figure 1:
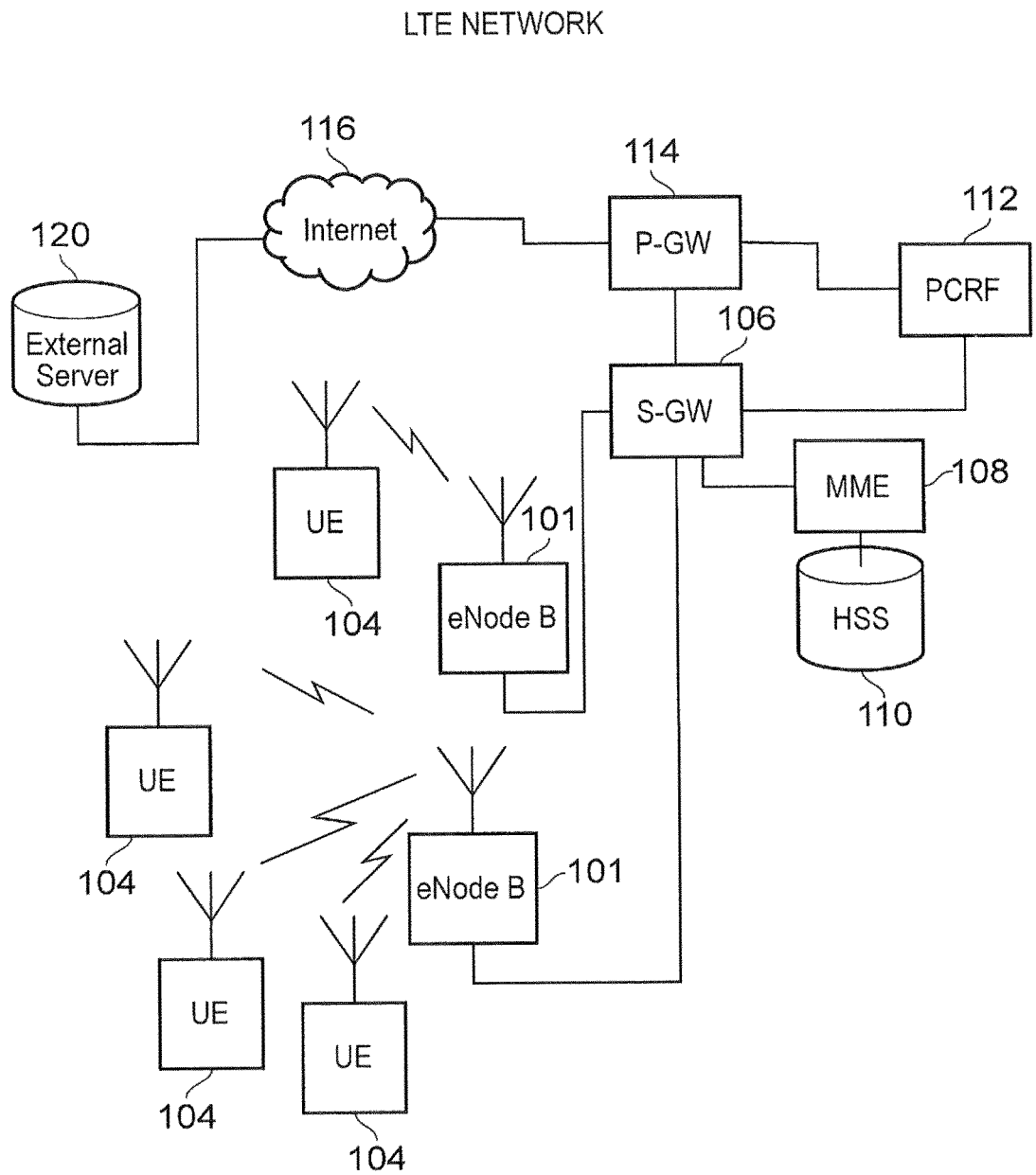
FIG. 1 provides a schematic block diagram illustrating an example wireless communications system according to an LTE standard.

Example embodiments of the present technique will now be described with reference to wireless access networks configured in accordance with LTE standards as defined by the 3GPPP. However it will be appreciated that this is just one example and embodiments of the present technique are not limited to LTE standards, but find applications with other radio access technologies and standards. FIG. 1 provides a schematic diagram illustrating some basic functionality of a wireless communications network/system. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the communications network which are not specifically described below may be implemented in accordance with any known techniques, for example according to the relevant standards such as those according to 3GPP Long Term Evolution (LTE) standards.

The wireless communications system shown in FIG. 1 includes infrastructure equipment including base stations 101. The infrastructure equipment 101 may also be referred to as a base station, network element, enhanced NodeB (eNodeB (eNB)) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface. The core network 102 may also provide functionality including authentication, mobility management, charging and so on for the communications devices served by the network entity.

The mobile communications devices 104 of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links.

As shown in FIG. 1 eNB's 101 are connected to a serving gateway S-GW 106 which is arranged to perform routing and management of mobile communications services to the communications devices 104 as they roam throughout the mobile radio network. In order to maintain mobility management and connectivity, a mobility management entity (MME) 108 manages the enhanced packet service (EPS) connections with the communications devices 104 using subscriber information stored in a home subscriber server (HSS) 110. Other core network components include the policy charging and resource function (PCRF) 112 a packet data gateway (P-GW) 114 which connects to an internet network 116 and finally to an external server 120. More information may be gathered for the LTE architecture from the book entitled "*LTE for UMTS OFDN and SC-FDMA based radio access*", Holma H. and Toskala A. page 25 ff.

Figure 2:
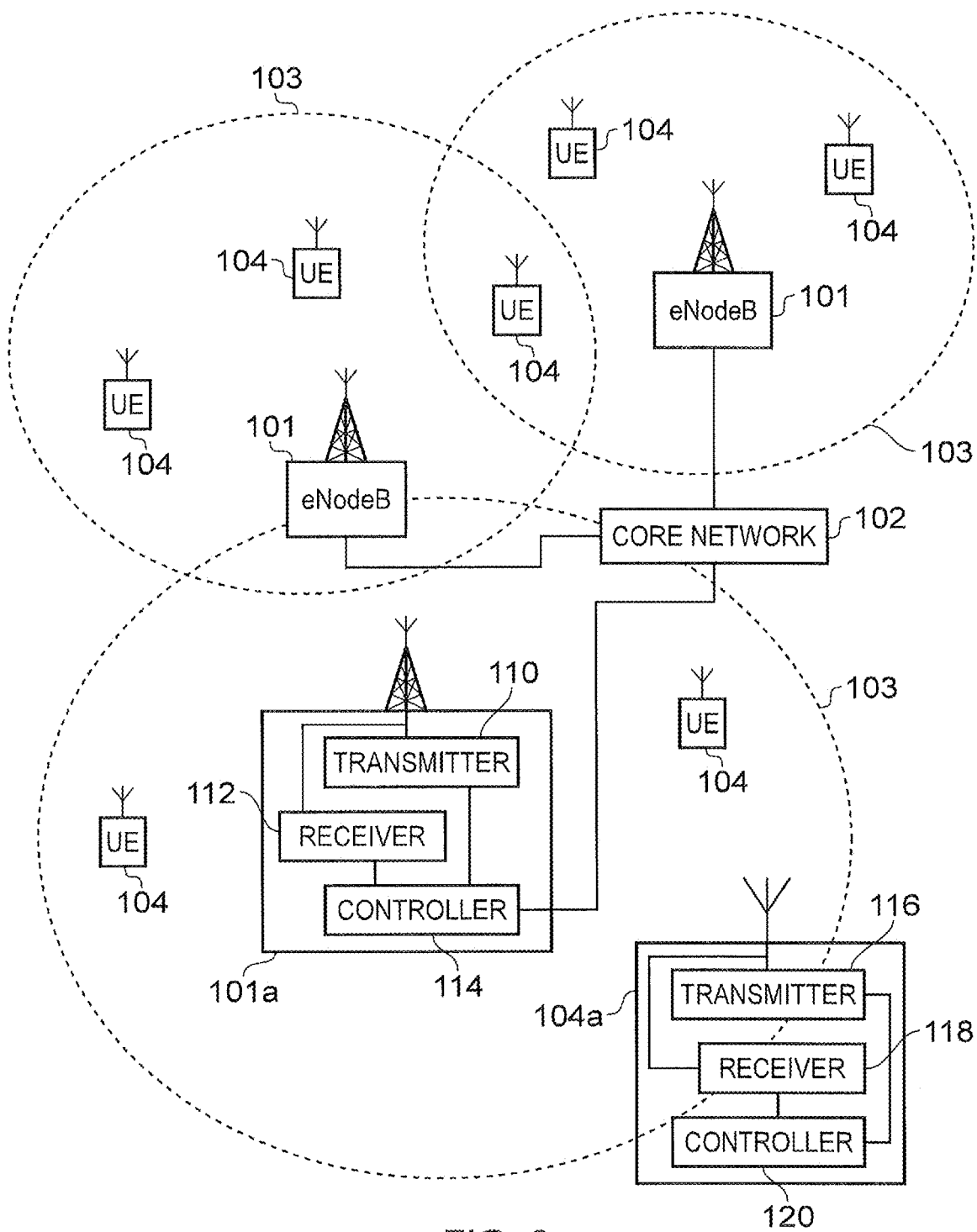
FIG. 2 provides a more detailed view of infrastructure equipment, including base stations (referred to as eNodeBs) forming radio access network within a radio coverage area provided by the base stations.

FIG. 2 provides a more detailed representation of part of the mobile communications system shown in FIG. 1 which form part of what is referred to as a radio access network or RAN. In FIG. 2, the serving gateway 106, the mobility management entity 108 and the home subscriber server 110 are represented generally as a core network 102. The infrastructure equipment 101 (eNodeB) provides a wireless access interface to the one or more communications devices within a coverage area or cell represented by a broken line 103. One or more mobile communications devices 104 may communicate data via the transmission and reception of radio signals representing data using the wireless access interface, forming what can be referred to as a radio access network.

As shown in FIG. 2, one of the base stations 101a is shown in more detail to include a transmitter 110 for transmitting signals via a wireless access interface to the one or more communications devices or UEs 104, and a receiver 112 to receive signals from the one or more UEs within the coverage area 103. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and the downlink.

An example UE 104a is shown in more detail to include a transmitter 116 for transmitting signals on the uplink of the wireless access interface to the eNodeB 101a and a receiver 118 for receiving signals transmitted by the base station 101a on the downlink via the wireless access interface. The transmitter 116 and the receiver 118 are controlled by a controller 120.

LTE Wireless Access Interface

Wireless communications systems such as those arranged for example in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. Embodiments of the present technique will be described in the following paragraphs with reference to terminology used in an LTE wireless access interface and technique. To assist in this explanation Annex 1 provides a detailed description of various channels for both uplink and downlink transmissions, including a physical downlink control channel (PDCCH), a physical downlink shared channel (PDSCH), a physical random access channel (PRACH) with which those acquainted with LTE standards may already be familiar.

Downlink Data Transmission

To transmit data to a communications device (UE), it is necessary to locate a UE within a wireless communications network and to establish a connection with the UE for transmitting the data to the UE.

A process for establishing a connection with a UE includes a paging procedure, which informs the UE that the network has data to transmit to it so that the UE should enter an active state and establish a connection. To this end, a paging message is transmitted to the UE as part of the paging procedure. A summary of the paging procedure for LTE can be found in [2].

Figure 3:
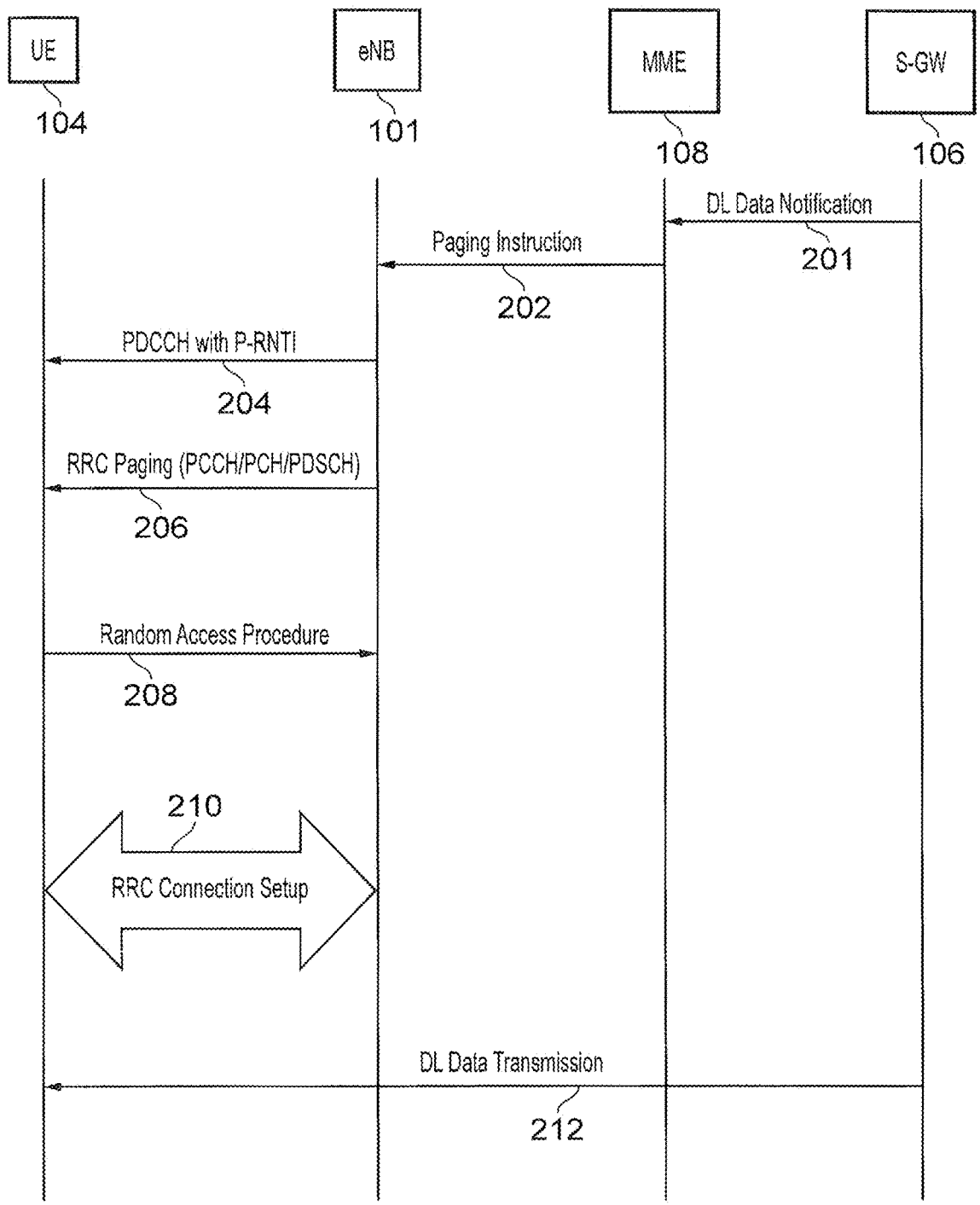
FIG. 3 is a message flow diagram illustrating a process of transmitting downlink data from a wireless communications network to a communications device.

FIG. 3 provides a simplified representation of a paging procedure according to that which is currently proposed within LTE. As shown in FIG. 3, paging occurs when data is to be transmitted to a UE 104 on the downlink. The data is received at the network and forwarded to the serving gateway S-GW 106. The S-GW 106 generates a notification 201 indicating that the wireless communications network has received downlink data for transmission to a UE 104. The downlink data notification 201 is received at the MME 108 which holds the latest mobility information of the UE within the wireless access network. MME 108 has stored in a location management data base, the eNB to which the UE 104 last indicated that it was attached. As explained above the MME 108 is responsible for mobility management for the UEs and therefore is aware of a current location of each UE within an area comprising a plurality of eNBs. The MME 108 then sends a paging instruction 202 to a group of eNBs in the area in which the UE is located, including the eNB 101 to which the UE 104 is currently attached. The eNB 101 then proceeds to transmit a paging message 204 to the UE 104, so that the UE 104 knows that it should move into a CONNECTED state to receive the downlink data.

As shown in FIG. 3 when a paging occasion occurs for the UE 104, the eNB 101 transmits in the PDCCH for the UE a paging identifier 204 known as a paging-radio network temporary identifier (P-RNTI). The UE 104 receives the P-RNTI from the PDCCH which also provides an indication of the communications resources of for example a shared channel (PCCH/PCH/PDSCH) in which the paging message will be transmitted. Therefore at step 206 the eNB 101 transmits an RRC paging message within the communications resources of the PDSCH, which have been indicated by the PDCCH in message 204 in the downlink control information (DCI). If the UE 104 detects its identifier within the paging message 206 transmitted on the shared communications resources (PDSCH), then the UE 104 performs a random access procedure 208 in order to set up an RRC connection with the eNB 101.

The random access procedure 208 conventionally requires that the UE 104 transmits a preamble in the uplink PRACH. In response, there then follows an RRC connection setup exchange of messages 210 which establishes an RRC connection with the UE 104 so that the downlink data can be transmitted to the UE in communications represented by an arrow 212. To assist in understanding the advantages provided by embodiments of the present technique FIG. 4 provides a brief summary of the random access procedure 208 shown in FIG. 3.

Figure 4:
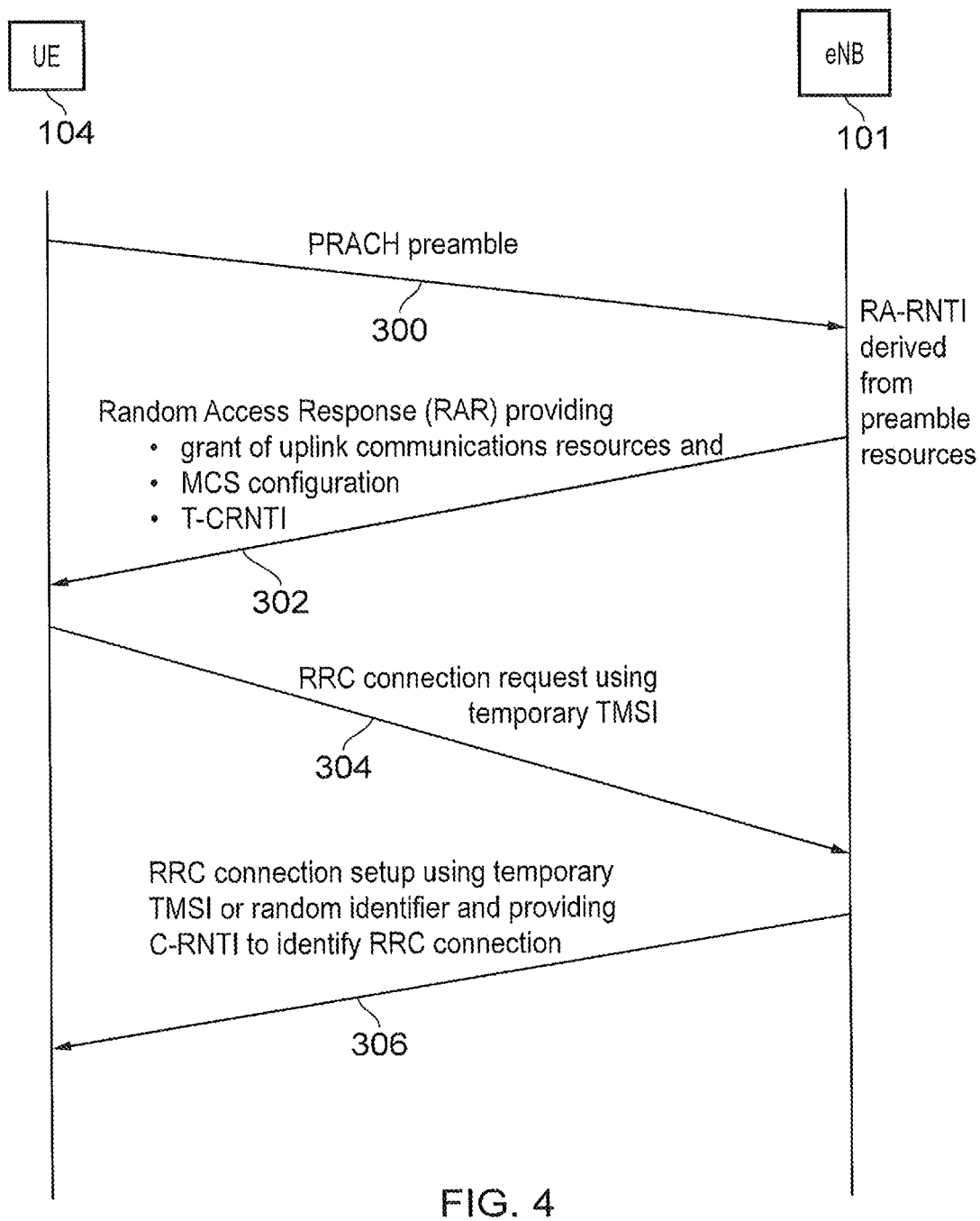
FIG. 4 is a message flow diagram illustrating a random access process performed by a communications device when requesting communications resources for transmitting or receiving data via a wireless communications network.

As shown in FIG. 4, the UE 104 transmits a PRACH preamble 300 in the PRACH channel. The eNodeB then detects the preamble transmitted by the UE 104. In response the eNodeB 101 transmits a Random Access Response (RAR) 302 as part of the RACH procedure. The eNodeB 101 transmits the RA-RNTI which it derived from the resource used by the preamble 310 received from the UE 104 in the PRACH preamble 300. The RAR 302 includes an uplink grant encoded on the RAR message which is assigned to the UE. The RAR includes the uplink modulation and coding scheme (MCS) to be used in the uplink resources assigned to the UE (i.e. the uplink grant indicates the format to be applied to the subsequent transmission 304 from the UE). The UE can therefore use this uplink grant to transmit the RRC connection request 304. The RAR 302 also includes a temporary radio network identifier (T-CRNTI) which is used by the UE subsequently to transmit information to the eNodeB 101. The UE 104 then transmits in response to the RAR an RRC connection request message 304. The UE 101 forms the RRC request message using the temporary TMSI which it received from the network in a previous connection, or using a random ID. In response to the RRC connection request message 304, the eNodeB 101 transmits an RRC connection set up message 306 using the ID (temporary TMSI or random ID) generated by the UE in the RRC connection request message 304. The RRC connection set up message 306 includes an allocation of the C-RNTI which the UE uses to identify its connection to the eNodeB in all subsequently exchanged messages. At this point therefore the UE 104 is considered to have a connection or a context because the communications link between the eNodeB 101 and the UE 104 can be identified using the C-RNTI.

RRC Idle/Connected States

An idle mode is a state in which the UE does not have dedicated resources and does not transmit or receive user data apart from performing actions necessary to manage its own mobility. In the idle mode state, the UE also performs monitoring for paging. This requires that the UE 104 monitors broadcast signals transmitted on a BCCH by each eNB 101. In a connected state, the UE 104 has established an RRC connection and has dedicated resources for transmitting or receiving data and the wireless access network is responsible for the UE's mobility and directs the UE to perform handover.

Figure 5:
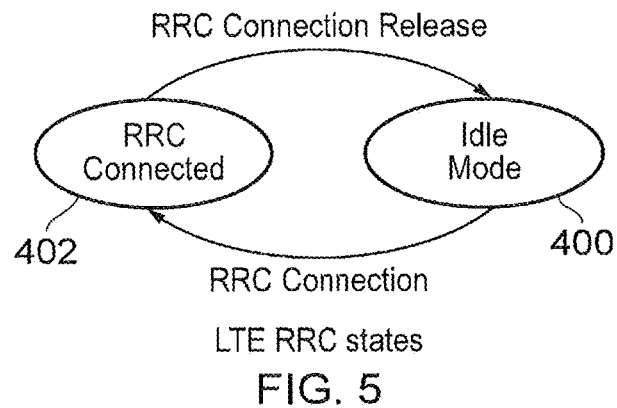
FIG. 5 is a diagram representing the states of a communications device when communicating via a radio access network provided by a wireless communications network.

As shown in FIG. 5, when the UE establishes an RRC connection, the UE moves from the idle mode or state 400 to the connected mode or state 402. In the RRC connected state 402, the network is aware of the UE's location at the cell level and has the UE context thereby allowing scheduling of physical resources for user data transmissions because the UE has been assigned a temporary ID which is unique to that UE within the cell (C-RNTI) and hence the UE can be directly addressed by the network. In the Idle state 400, the network is aware of the UE's location within a Tracking Area and does not have the UE AS (access stratum) context and cannot schedule physical resources for user data transmission because the UE does not have a unique identifier within a cell (C-RNTI). The UE moves from an Idle state 400 to an RRC connected state 402 by establishing an RRC Connection which assigns a C-RNTI and is initiated by using a random access (RACH) procedure. The UE moves from RRC connected state 402 to the idle state 400 by releasing its RRC connection (and hence releasing its C-RNTI). In the idle state 400, a UE is addressed by first paging the cells within the tracking area. The UE monitors for P-RNTI (paging identifier) on PDCCH rather than C-RNTI as it does in the RRC connected state 402. The paging message which is received following P-RNTI detection contains the UE's identity, and if the UE detects its identity it will then respond by performing RACH and transmitting an RRC Connection Request to initialise an RRC connection establishment, and having an C-RNTI assigned to it in the RRC Connection Setup message as explained above with reference to FIG. 4.

As indicated above, as part of a process for establishing an RRC connection as well as for performing other functions Radio Network Temporary Identifiers (RNTI) of different types are used to identify a connected mode UE in the cell, or a specific radio channel Types of RNTIs include:
P-RNTI: Paging RNTI. Used for Paging Message.
SI-RNTI: System Information RNTI. Used for transmission of SIB messages
RA-RNTI: Random Access RNTI. Used for PRACH Response.
C-RNTI: Cell RNTI. Used for the transmission to a specific UE after RACH.
T-CRNTI: Temporary C-RNTI Mainly used during RACH
SPS-C-RNTI: Semi persistent Scheduling C-RNTI
TPC-PUCCH-RNTI: Transmit Power Control-Physical Uplink Control Channel-RNTI
TPC-PUSCH-RNTI: Transmit Power Control-Physical Uplink Shared Channel-RNTI
M-RNTI: MBMS RNTI
RNTI values are given in TS 36.321 section 7.1 ([6]).

Development of New Radio Access Technologies

It has been proposed to develop new radio access technologies for the next generation wireless communication system, i.e. 5G [1]. The new RAT is expected to operate in a large range of frequencies, from hundreds of MHz to 100 GHz and it is expected to cover a broad range of use cases. The use cases that are considered under this SI are:
Enhanced Mobile Broadband (eMBB)
Massive Machine Type Communications (mMTC)
Ultra Reliable & Low Latency Communications (URLLC)

As those acquainted with LTE will appreciate, LTE systems are designed for mobile broadband where large data transmission is performed in the RRC connected state. As explained above, when the UE is not performing data transfer, it moves into Idle mode or state with a long discontinuous reception (DRX) period for power saving. When the UE comes out of a long DRX period to receive data, which represents a paging occasion, it activates its receiver to detect paging messages as indicated above. However, it has been proposed in [3] to introduce a new mode, which is a so-called "light connection mode". According to this proposal, a further state is specified in which the UE is in the RRC idle state from a RAN point of view, that is with no active RRC connection, whilst at the same time being in a connected state in respect of the core network, which is referred to as enhanced packet service connection management (ECM) connected state from a core network point of view. This has the benefit of being able to allow the UE to enter a more power efficient state, while reducing the signalling between the core network and the radio access network. The overall procedure allows the radio access network to take over responsibility for paging the UE, effectively hiding the RRC state transitions and mobility from the core network, and the core network can therefore directly send data as if the UE was still connected and in the same cell. From the radio access network point of view, an "anchor" eNodeB is defined as being the last eNodeB to which the UE was attached, or the eNodeB which maintains the core network connection for the UE. The anchor eNodeB stores the UE context information. When the core network attempts to transmit data, the radio access network then attempts to page the UE on the anchor eNodeB, and if there is no response, the paging may then be performed on all of the cells in the tracking area, in order to locate the UE. A summary of RAN based paging may be found in [h] and the concept of the anchor eNodeB is represented by the RAN based paging technique shown in FIG. 6.

Figure 6:
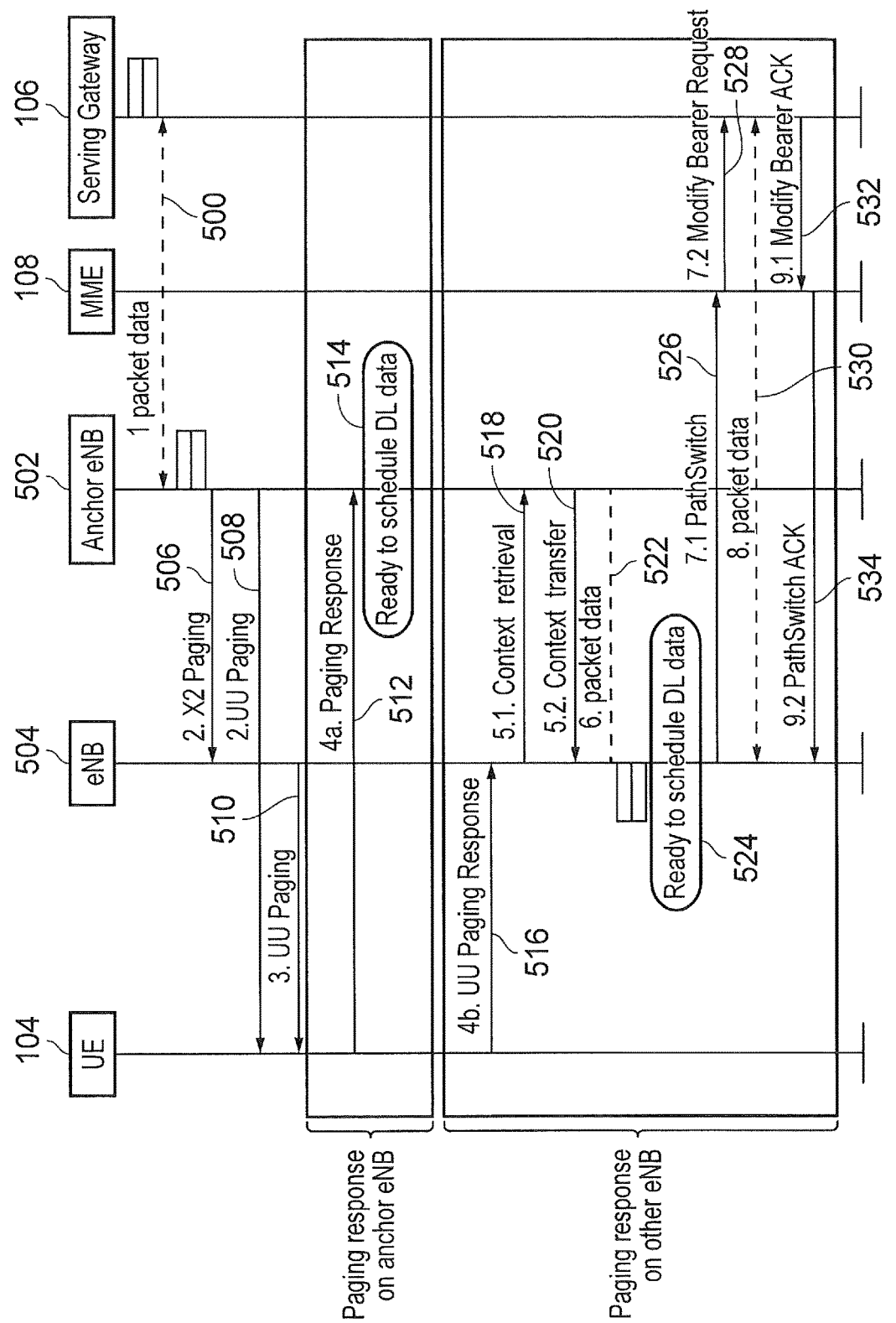
FIG. 6 is a message flow diagram part block diagram illustrating an arrangement in which one of a group of base stations (eNodeBs) acts as an anchor base station for a communications device.

FIG. 6 provides a message exchange flow diagram disclosed in [3]. As represented in FIG. 6 by a dashed arrow 500, data is forwarded to the eNodeB 102 to which the UE 104 was last attached as represented in FIG. 3 by arrows 201, 202 and in FIG. 6 by arrow 500. Thus, the eNodeB 502 to which the UE 104 was last attached is referred to as the anchor eNodeB. The anchor eNodeB then attempts to transmit the data by paging the UE using the paging instruction 202 and the PDCCH PRNTI 204 as shown in FIG. 3. The anchor eNodeB instructs neighboring eNodeBs 504 using a message 506 via the X2 interface which is an interface connecting eNodeBs within a particular area. The anchor eNodeB 502 also transmits a paging message to the UE 508 and the neighboring eNodeBs 504 also transmit the same paging message 510. If the UE 104 receives the paging message from the anchor eNodeB 502 then it transmits a paging response message 512 to the anchor eNodeB 502, which corresponds to the Random Access Procedure 208 shown in FIG. 4, in which the UE requests uplink resources to transmit the paging response message 512. Thereafter, as represented by process step 514 the anchor eNodeB 502 transmits the data to the UE 104 after setting up an RRC connection as represented by steps 210, 212 from FIG. 3. If however the UE 104 transmits a paging response 516 to one of the neighbouring eNodeBs 504 then the eNodeB 504 which received the paging response 516 retrieves the context information for the UE from the anchor eNodeB 502 which is transmitted to the eNodeB 504 via message exchange 518, 520. Downlink transmission of the data then occurs in step 522 and process step 524. The remaining steps and messages 526, 528, 530, 532 and 534 are to arrange for the data to be forwarded to the neighbouring eNodeB 504 which received the paging response message and retrieved the context information for the UE in accordance with a conventional arrangement.

Enhanced Downlink Embodiment

Figure 7:
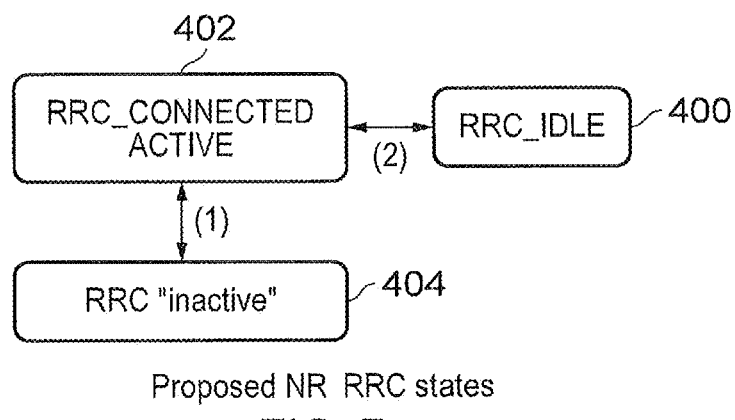
FIG. 7 is a diagram representing the states of a communications device when communicating via a radio access network, but including a further "inactive-connected" mode or state.

As already explained, future radio access interfaces may be required to cater for a large range of services. One such service involves sporadic data transmission of small and mid-sized packets that would also benefit from long DRX for power saving. Such a service does not fit well into the existing LTE RRC states and hence a new "RRC Inactive CONNECTED" RRC state or Inactive-connected state has been proposed for example in 3GPP, such as in [5]. According to this proposal a state diagram of the RRC connection status becomes that shown in FIG. 7. The above proposal assumes that the UE monitors a paging channel, to detect a paging message such as the paging-radio network temporary identifier (P-RNTI). Furthermore according to another proposal [6] a radio access network can provide a radio access network (RAN) routing area (RRA) which is an area within the network which the UE may perform cell reselection without notifying the network. A RAN anchor eNodeB is defined, similar to the arrangement presented above with reference to FIG. 6, in which the radio access network pages the UE within the RRA for the UE.

Embodiments of the present technique can provide an infrastructure equipment for forming part of a radio access network of a wireless communications network. The infrastructure equipment is configured to transmit a radio network identifier to a communications device, which is allocated by the infrastructure equipment for identifying the communications device when allocating communications resources of the wireless access interface for transmitting downlink data to the communications device, and after the communications device has entered an inactive-connected state, in which the communications device monitors for signals transmitted from the infrastructure equipment, to transmit control signals including the radio network identifier for allocating communications resources of the wireless access interface for the communications device to receive downlink data, and to determine whether the communications device is still within a radio coverage area for transmitting signals to and receiving signals from the infrastructure equipment. If the communications device has left the coverage area, the infrastructure equipment is configured to transmit an indication to one or more other infrastructure equipment forming part of the radio access network via an inter-connecting interface to trigger a process for transmitting downlink data to the communications device from the one or more other infrastructure equipment.

Embodiments of the present technique therefore provide an arrangement in which a UE and a radio access network maintain a radio network identifier, which may be for example a radio network temporary identifier such as a C-RNTI allocated by a base eNodeB for allocating resources of a wireless access interface provided by the eNodeB and monitors for this C-RNTI in order to receive downlink data while in the inactive-connected state on the same cell on which the UE entered inactive-connected state, and switches to monitoring for the P-RNTI after reselecting to a new cell.

As will be understood from the following explanation, a wireless communications network operates in a similar way to a "light connected" state proposed for LTE as explained above. However, instead of a radio access network (RAN) attempting to page on an anchor eNodeB, according to steps 3 and 4a in FIG. 6, the RAN attempts a direct data transmission on an anchor or base eNodeB. If there is no response then the RAN pages in a local tracking area formed from a plurality of eNodeBs and thereafter the procedure is similar to that defined in FIG. 6.

In some embodiments, there may be multiple attempts at a direct data transmission on the anchor or base eNodeB, since it is possible that the initial direct data transmission is errored. Hence there may be a maximum number of attempts at a direct data transmission before the RAN pages in the local tracking area. Alternatively RAN paging in the local tracking area can be initiated once a timer has expired, where the timer is initiated when the initial direct data transmission is sent. Embodiments of the present technique therefore differ from the previous proposals described above for light connected or inactive state in that no paging is necessary, as long as the UE location has not changed at the cell level and data can be sent without a paging or associated random access procedure described above. This would be in case the UE is on the same cell in which it was when it entered the inactive state (anchor or base cell).

According to example embodiments of the present technique, in an RRC inactive CONNECTED state, the network maintains a UE's complete UE context, including a C-RNTI (or similar temporary ID which uniquely identifies the UE).

According to conventional arrangements for wireless access networks, such as those defined for LTE standards, the network schedules a downlink physical resource using a PDSCH (see Annex) to a UE using a control channel, e.g. E-PDCCH, PDCCH, MPDCCH or NPDCCH. One difference between the current idle and connected states for LTE is that the UE monitors PDCCH for a previously allocated C-RNTI, which indicates data addressed to that UE is being transmitted on PDSCH in connected state, while in the idle state the UE monitors PDCCH for P-RNTI, indicating a paging message which might be addressing that UE is being transmitted on PDSCH. Example embodiments of the present technique can arranged to transmit data to a UE without a paging procedure, as long as the UE cell location has not changed. As a result, the UE can be in a power efficient inactive state, but still receive data from the network without an overhead and delay associated with paging. This may be suitable for small data transmissions, so that the UE can stay in the inactive state, and it may also be suitable for causing a transition to a "fully" connected state with low latency state transition.

Figure 8:
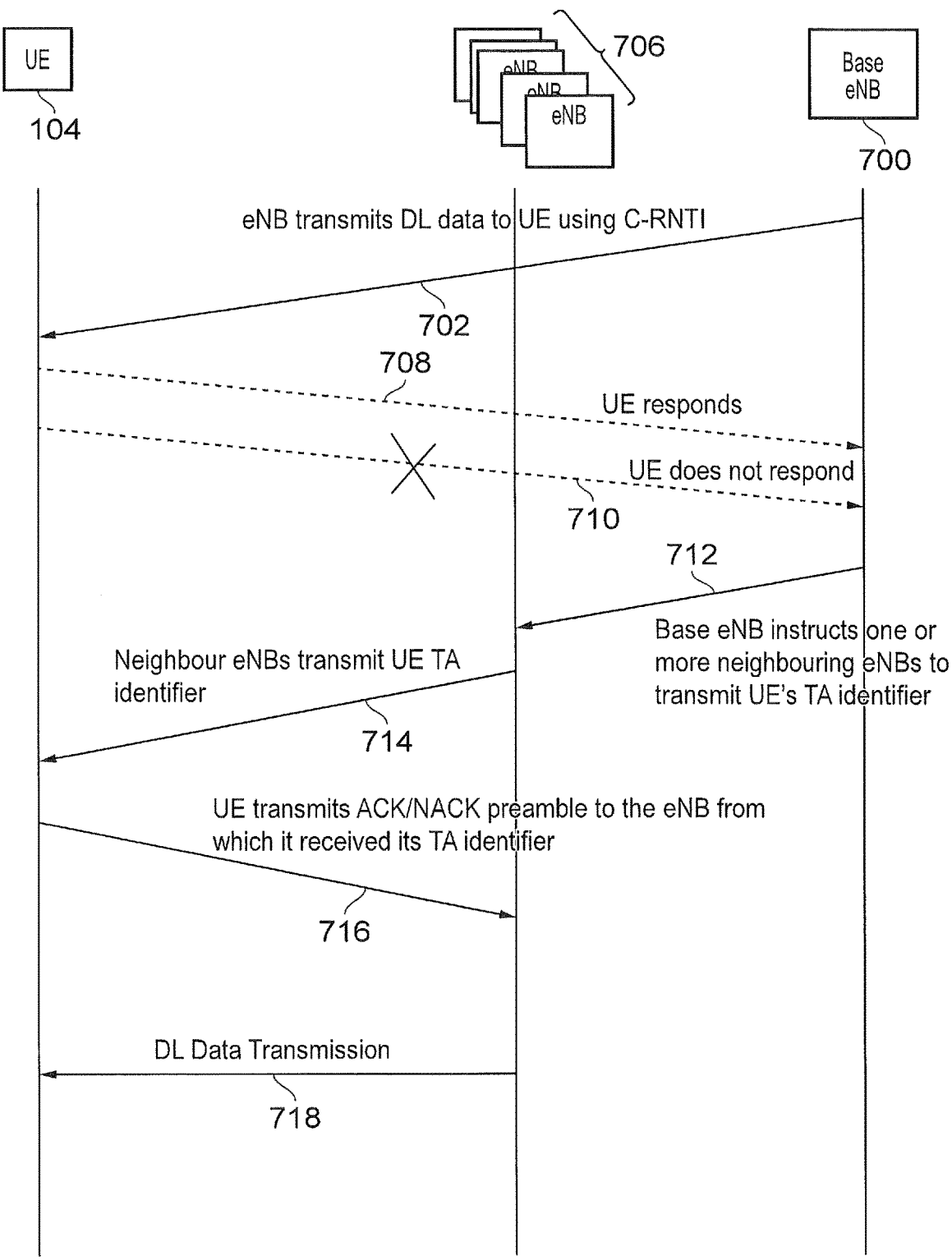
FIG. 8 is a message flow diagram illustrating a process of transmitting downlink data from a wireless communications network to a communications device according to an example embodiment of the present technique.

FIG. 8 provides a message exchange diagram according to an example embodiment of the present technique. As shown in FIG. 8, an anchor or base eNodeB 700 first attempts to transmit downlink data to the UE using the C-RNTI when the UE is in the RRC inactive state 404. The eNodeB therefore transmits in a message 702 downlink data to the UE 104 using the C-RNTI, which it previously established following the RRC connection set up process 210. As will be explained shortly, according to one embodiment of the present technique the UE 104 responds with an ACK or NACK preamble in the RACH response which therefore does not require the step of performing paging and the Random Access Response represented by the process steps in FIG. 4. The UE 104 transmits the response to the eNodeB 700. Therefore if the UE 104 is within a coverage area provided by the base eNodeB 700 then the UE 104 proceeds to transmit the ACK/NACK preamble in accordance with the indication that it has received or not received the downlink data. However, if the UE 104 is no longer within a coverage area provided by the base eNodeB 700 (the eNodeB 700 can determine this if it does not receive a random access response from the UE, or there is a timeout before preamble response is received from the UE) then the base eNodeB 700 proceeds to transmit an indication 712 to one or more neighboring eNodeBs 706 within a local tracking area or routing area (RRA) provided for local mobility. The local tracking or routing area could be the same tracking area as is provided for a conventional LTE radio access network. Alternatively, the local tracking or routing area could be a new tracking area provided for local mobility of the UE 104, which is comprised of a plurality of eNodeB's for example in a neighbouring cluster. Hence if the UE 104 has not transmitted preamble response to the eNodeB 700 as represented by the dotted arrow 710, in contrast to the response which was received by the eNodeB 700 as represented by a dotted line 708 then the eNodeB transmits in a message 712 an indication that the one or more neighbouring eNodeB 706 should transmit using the UE's tracking or routing area identifier. This is because the UE 104 is in the RRC inactive-connected state in which it has a stored RRC context already (it was only suspended, and it can be resumed). However, it has not responded to the CRNTI issued by the eNodeB 700. Each of the one or more neighbouring eNodeBs 706 then transmits to its neighbour eNodeB the UE's tracking or routing area identifier. If the UE 104 is within a coverage area provided by one of the neighbouring eNodeB's 706 then the UE transmits the response to the eNodeB from which it received the tracking or routing area identifier as represented by an arrow 716. The eNodeB 706 of the set of eNodeBs 706 in the local tracking or routing area, which received the response 716 from the UE 104 proceeds to transmit the downlink data to the UE 104 as represented by an arrow 718.

In another embodiment, a Tracking Area UE ID (TA-ID or TA-RNTI) or a RAN Routing area temporary ID (RRA_RNTI) is assigned to a UE when it enters an RRC Inactive (inactive connected) State. This identifier is unique to a UE within a tracking area or a RAN routing area, and is arranged to identify the UE within a certain group of interconnected base stations which is referred to as a local tracking area. Hence instead of initiating a paging to an Inactive State UE, the packet can be transmitted to the UE by using this TA-ID in the control channel. For example the UE monitors PDCCH using this TA-ID. Alternatively a RRA-ID (or RRA-RNTI) may be assigned, which applies within a RRA. Therefore in the following paragraphs describing different embodiments TA-ID will be used to describe different alternatives.

In an example embodiment of the technique, the TA-ID is formed from an identifier of the "anchor eNodeB" and the C-RNTI that the anchor eNodeB assigned to the UE. An example formation is that the TA-ID is a concatenation of the anchor eNodeB and the C-RNTI: $\{ID_{anchor\_eNodeB}, C\text{-}RNTI\}$: this concatenated bit string is unique within the network.

In the case that UE moves to a new cell without notifying the anchor eNodeB, the data can be sent within all the cells in the local Tracking Area, which is different from conventional tracking area, and is formed as a RAN defined local tracking area. This has an advantage because radio resources can be used more efficiently if data is small and the local tracking area is not large. As a further optimization, instead of sending data directly, the cells will send a bit in the control channel associated with TA-ID to indicate that there is data for this UE. With this indicator, the UE will send a response to its serving cell e.g. in the uplink control channel associated with TA-ID. The serving cell will send the data to UE afterwards.

According to some examples, because the TA-ID is arranged to be unique within a Tracking Area, it is likely to be longer than that of C-RNTI, which is only required to be unique within a cell. Therefore, in an embodiment a different downlink control indicator (DCI) format to that used for paging is used where this DCI can carry the longer TA-ID. For example, if the TA-ID is M+N bits, the CRC of the DCI is masked with the M most significant bits of this TA-ID and a field in the DCI would contain the remaining N bits of the TA-ID.

In another embodiment, part of the TA-ID is contained in the DCI and the remaining bits of the TA-ID are transmitted in the data channel (e.g. PDSCH). For example, for a TA-ID with M+N bits, the CRC of the DCI is masked with the M most significant bits whilst the remaining N bits of the TA-ID is masked with the CRC of the data channel (e.g. PDSCH).

In another embodiment, part of the TA-ID is contained in the DCI and the associated data channel (e.g. PDSCH) is scrambled with a sequence that is a function of the other part of the TA-ID. For example, for a TA-ID with M+N bits, the CRC of the DCI is masked with the M most significant bits whilst the remaining N bits of the TA-ID are used to scramble the PDSCH with a sequence that is a function of the N bits. The UE may only respond to the DCI if the PDSCH is correctly received (this avoids collisions of NACKs transmitted by other UEs with differing "N bit" fields).

According to another example embodiment a control channel scheduling the data packet for transmission to a UE using TA-ID can be in a separate search space to that used for paging. A different number of candidates can be used for a TA-ID based search space.

In another embodiment, the UE monitors control channel (e.g. PDCCH) using P-RNTI for possible paging. The DCI scheduling the paging message contains a bit to indicate that the paging is a "direct data packet" to a specific UE. The UE then monitors the paging message which contains the UE TA-ID and the data for that UE.

In another example of a TA-ID, once the UE responds with an ACK to a packet with TA-ID, it can be further assigned a C-RNTI for subsequent packets and uses a smaller length identifier. If dual identifiers are used for the UE, the UE will monitor for C-RNTI if it has not moved away from the cell that assigned this C-RNTI otherwise the UE would use TA-ID if it has moved away from this cell.

Hence embodiments of the present technique can provide an arrangement in which, the network would send the data packet directly to the UE using the last known cell using C-RNTI and failing that it would use the TA-ID to send the data packet directly to the UE in the Tracking Area. In a further embodiment, if the network fails to send the packet directly to the UE using TA-ID then it will initiate a paging procedure for this UE.

In another embodiment, the TA-ID consists of a DRX phase and a shorter UE identity. For example, for a TA-ID with M+N bits, the CRC of the DCI is masked with the M most significant bits whilst the remaining N bits of the TA-ID are used to determine the DRX phase at which the UE wakes up and attempts to decode the TA-ID. In this way, multiple UEs can share the same DCI masking field of M-bits in duration, but each of those multiple UEs attempts to decode the TA-ID in different subframes. In this way, the eNodeB can send a message to a particular UE by sending that message at the appropriate DRX phase.

When the UE reselects a cell outside of the TA or RRA, which can be identified by a broadcast identifier in the cell then the UE notifies the network in order that the location can be updated in the network and a new identifier assigned to the UE.

This behaviour can be configurable depending on the network and operator preference, or the service requirements for that particular device. For example, a UE or service which requires lower latency, may be required to update the location at every cell change in order that data can always be directly sent to the device. This does come at some overhead for mobile UEs, since update signalling is required at every cell change, hence it may be desirable to configure the UE only to update at tracking area change. This does mean paging is required to find a UE that has moved, but reduces the overall signalling overhead.

Figure 9:
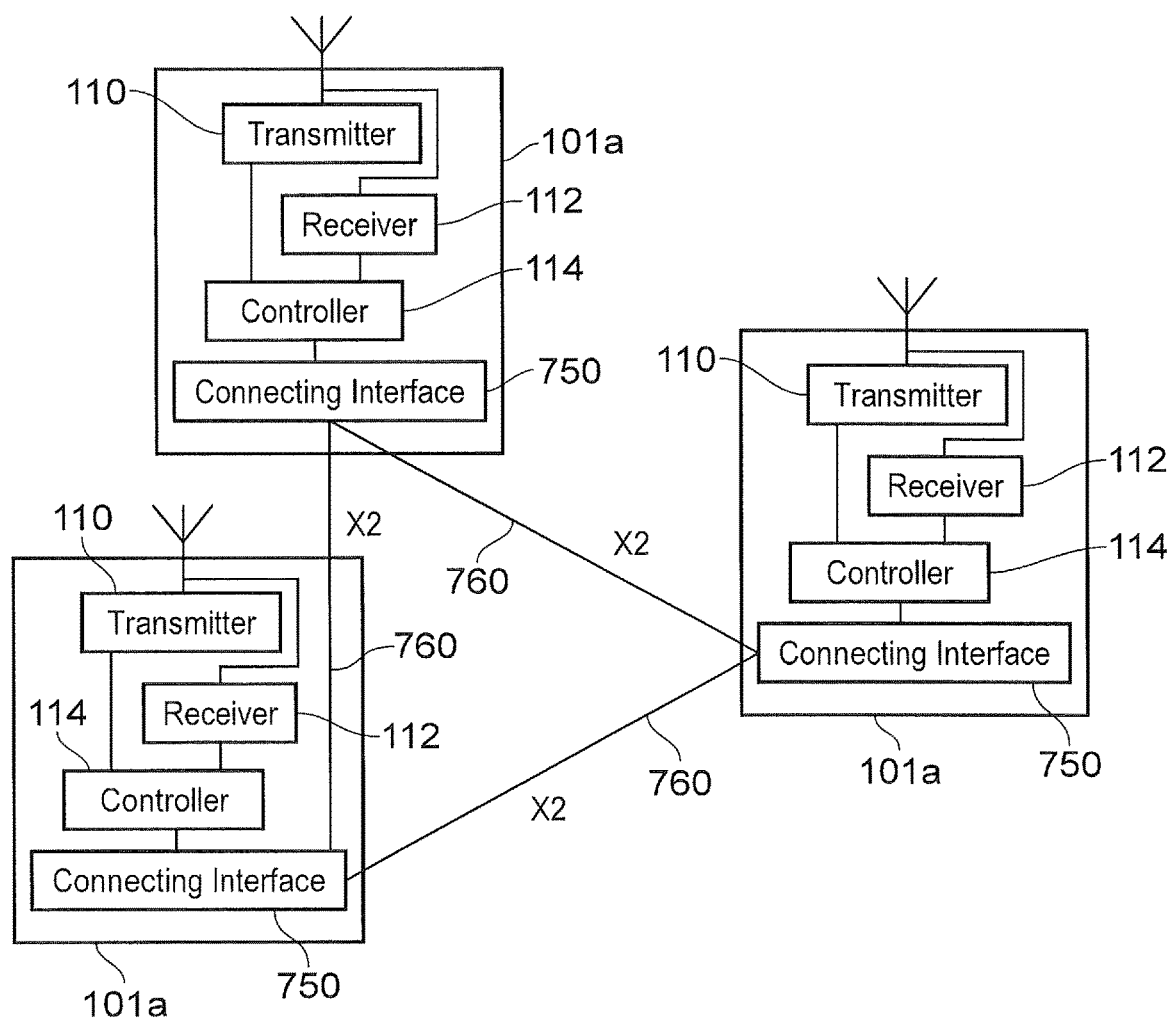
FIG. 9 is a schematic representation of three base stations which are inter-connected so that they form a local tracking area in accordance with an example embodiment of the present technique.

FIG. 9 provides an example presentation of a local tracking area which is comprised of three base stations (eNodeB) 101a. Each of the eNodeBs 101a is comprised of a transmitter 110, a receiver 112 and a controller 114 as shown also in FIG. 2. As shown in FIG. 9, each of the eNodeBs 101a also includes an inter-connecting interface 750, which allows messages to be exchanged between the eNodeBs 101a via an X2 interface connection 760. Accordingly, if a UE 104 cannot receive downlink data from its base eNodeB 101a, then that eNodeB 101a triggers transmission of a TA-ID to the UE 104 in any of the other two eNodeBs of the three in this example local tracking area.

Enhanced Uplink Embodiment

As indicated above, according to example embodiments of the present technique, in the proposed RRC CONNECTED Inactive (inactive connected) state, the network has a complete UE context, including a C-RNTI (or similar temporary ID which uniquely identifies the UE).

However the UE may be in long DRX similar to Idle Mode and as a consequence of long DRX, mobility and changes in radio condition, uplink synchronisation between the UE and network is not maintained as it is as when the UE is in RRC Connected mode.

The triggers for going between RRC Connected Active and RRC Inactive-connected state can be as follows:
1) RRC Connected Active to RRC Inactive
   a. Timer based
   b. Event triggered
   c. Network controlled based on above when no traffic
2) RRC Inactive to RRC Connected Active
   a. UE has been paged and concluded RACH procedure or transmits an ACK/NACK preamble according to the present embodiment
   b. If there is only one downlink packet for which an ACK/NACK is required then the UE stays in the Inactive connected or RRC Inactive state. If the UE or network has more data to convey, some mechanism would be needed to indicate state transmission is desired.

Figure 10:
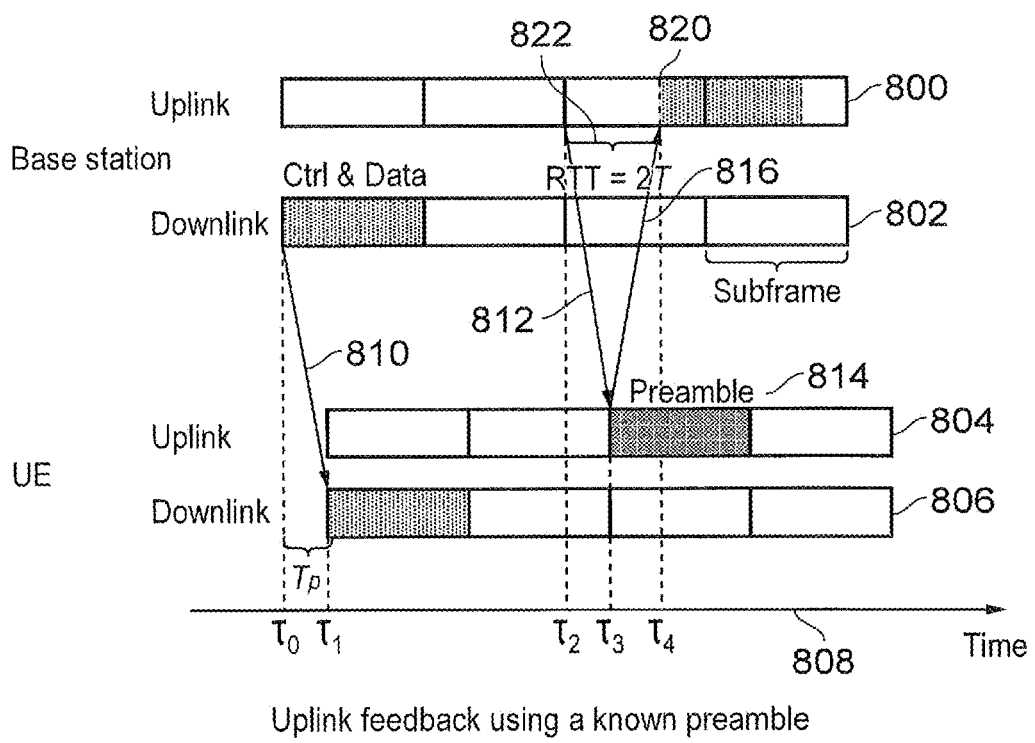
FIG. 10 is a schematic block diagram illustrating a relative timing of a transmission of a preamble as an uplink feedback signal.

According to example embodiments of the present technique, the UE is configured to transmit an uplink feedback signal, in the form of known preamble sequences, in response to a downlink packet sent directly to the UE using a C-RNTI in the RRC Connected Inactive state. This aspect recognises that sending a preamble allows for a simple correlator-type receiver to be used at the base station which is effective in an unsynchronised transmission. This aspect also takes advantage of the characteristic of an uplink feedback requiring very few information bits since a preamble can relay very little information. The uplink feedback can be transmitted using known time and frequency resources, which can be signalled by the network (broadcast or scheduled) or predefined in system specifications. For example in FIG. 10, a base station transmits downlink control and data at time $\tau_0$, which reaches the UE at time $\tau_1$ due to propagation delay of $T_P$. As shown in FIG. 10 a series of boxes represents the uplink and downlink frame structure as timing appears at the eNodeB and the UE 800, 802, 804, 806. The transmission is shown with respect to time 808. As shown a first downlink transmission 802, because of a propagation delay $T_P$ between the base station and the UE, as represented by an arrow 810, arrives at the UE at time $\tau_1$ caused by the propagation delay $T_P$. Similarly on the uplink, a propagation delay $T_P$ exists between the UE and base station. Therefore transmission of a preamble 814 as represented by an arrow 816 will arrive at the uplink frame structure in the base station, or eNodeB 800 at a point 820 which is delayed by $2 \times T_P$ 822 relative to the corresponding uplink frame structure of the eNodeB. Therefore, without synchronization and timing advance, transmission of the preamble will fall outside an expected reception window at the eNodeB. However, by correlating for ACK/NACK preambles transmitted by the UE, the eNodeB can still detect the preamble. Advantageously, the eNodeB will also be able to determine a timing advance value that should be applied to future uplink transmissions from the UE, allowing those UL transmissions to be time-aligned with the base station's timing.

In an example timing relationship, shown in FIG. 10, the base station expects (e.g. scheduled or predefined) the UE to transmit an uplink feedback 814 two subframes after receiving a DL transmission, that is the base station would start monitoring for these known preamble sequences at time $\tau_2$. Due to the round trip time (RTT) delay of $2 \times T_P$, and in the absence of timing advance, the preamble arrives at the base station later at time $\tau_4$. The correlator at the base station will continue monitoring for the UE's preamble transmission taking into account the maximum possible RTT. The uplink feedback 814 can be transmitted using one of the existing uplink channels such as PRACH, PUCCH or PUSCH or a new physical channel.

In an embodiment, the uplink feedback consists of one of two known preamble sequences, one representing an ACK and another representing a NACK. These two sequences can be configured by the base station to the UE as a set of preamble sequences. For example, a preamble sequence $P_{ACK} = \{1\ 1\ 0\ 0\ 1\ 1\ 0\}$ can represent ACK and the inverse of $P_{ACK}$ can represent NACK, i.e. $P_{NACK} = \{0\ 0\ 1\ 1\ 0\ 0\ 1\}$, which would give the maximum Hamming distance. It should be appreciated that any two preamble sequences with sufficiently large Hamming distance or sufficiently distinct correlation properties can be used.

In another embodiment, a single preamble sequence is assigned to the UE and the UE uses this sequence to either indicate "ACK" or "NACK". In this embodiment, the base station can configure the UE with a set of preamble sequences, which may in one example comprise a single preamble sequence. In other words, the system can be configured in one of the following two ways:
   When the UE sends the preamble, the base station understands that "ACK" has been transmitted.
   When the UE does not send the preamble, the base station infers "NACK".

In another embodiment, the known preamble sequences are UE specific. That is the preamble sequences are different from other preamble such as PRACH and each UE uses a different set of preamble sequences. This example embodiment would avoid any collision with other preambles (e.g. PRACH or from other UEs' uplink feedback) since this preamble is unique and the network determines the time and frequency resource for this preamble.

In another embodiment, the scheduling details of the uplink feedback preambles are indicated in the downlink control channel. For example, the set of preamble sequences to be used for uplink feedback is indicated in the downlink control information (DCI). As indicated above, the set may comprise only two sequences. A set of preamble sequences can be predefined, for example in a lookup table and the DCI indicates the index of the set of preamble sequences to be used for the uplink feedback. Alternatively a table containing sets of preamble sequences can be broadcast by the network and the DCI indicates one of the sets of preamble sequences to be used for the uplink feedback.

In another embodiment, the time and/or frequency resources used to transmit the preamble sequence are indicated in the control channel, such as the DCI.

In another embodiment, the time and/or frequency resources used to transmit the preamble sequence are derived from other scheduling parameters. That is, the time and/or frequency resources used to transmit the preamble sequence are implicitly indicated by the resources used to transmit the DCI or a data channel allocated by the DCI. For example, the time/frequency resources used to transmit the preamble can be the index of the resource used by the control or data channel plus an offset.

In another embodiment, preamble sequences are derived from other scheduling parameters. That is, the preamble sequences are implicitly indicated by the resources used to transmit the DCI or a data channel allocated by the DCI. For example, the preamble sequence used can be a function of the resource used by the control or data channel plus an offset. (e.g. use preamble sequence 0 when the first control channel is used, use preamble sequence 1 when the second control channel is used etc.).

In another embodiment, due to mobility the timing might have changed since last connected to the network. In case the UE has a stored timing advance value, the UE will use this stored value. Using the last timing advance value can provide improved network performance for stationary devices or low mobility devices.

In another embodiment, the set of preamble sequences is derived from the UE's own identifier (TIMSI, IMSI, C-RNTI, TA-ID or the like). For example the UE C-RNTI is used to determine an index pointing to an entry in a table of sets of preamble sequences. Alternatively, a formula can be used where one of the inputs is the UE identifier.

According to other examples the uplink feedback can consist of more than just a two state ACK/NACK, i.e. it can include radio condition information such as channel state information CSI. As such a greater number of states other than two states of uplink feedback can be provided by simply increasing the number of preamble sequences within a set. For example if the uplink feedback consists of eight different levels of CQI and ACK/NACK, then a set of sixteen unique preamble sequences can be used. In one example, different UEs can use different sets of 16 preamble sequences.

The uplink feedback may consist of an application layer indication. For example, the downlink message may contain an application layer command, such as "report status of valve" and the uplink feedback message (preamble) may indicate "valve open" by transmitting one preamble sequence and "valve closed" by transmitting a different second preamble sequence from the set of preamble sequences.

Figure 11:
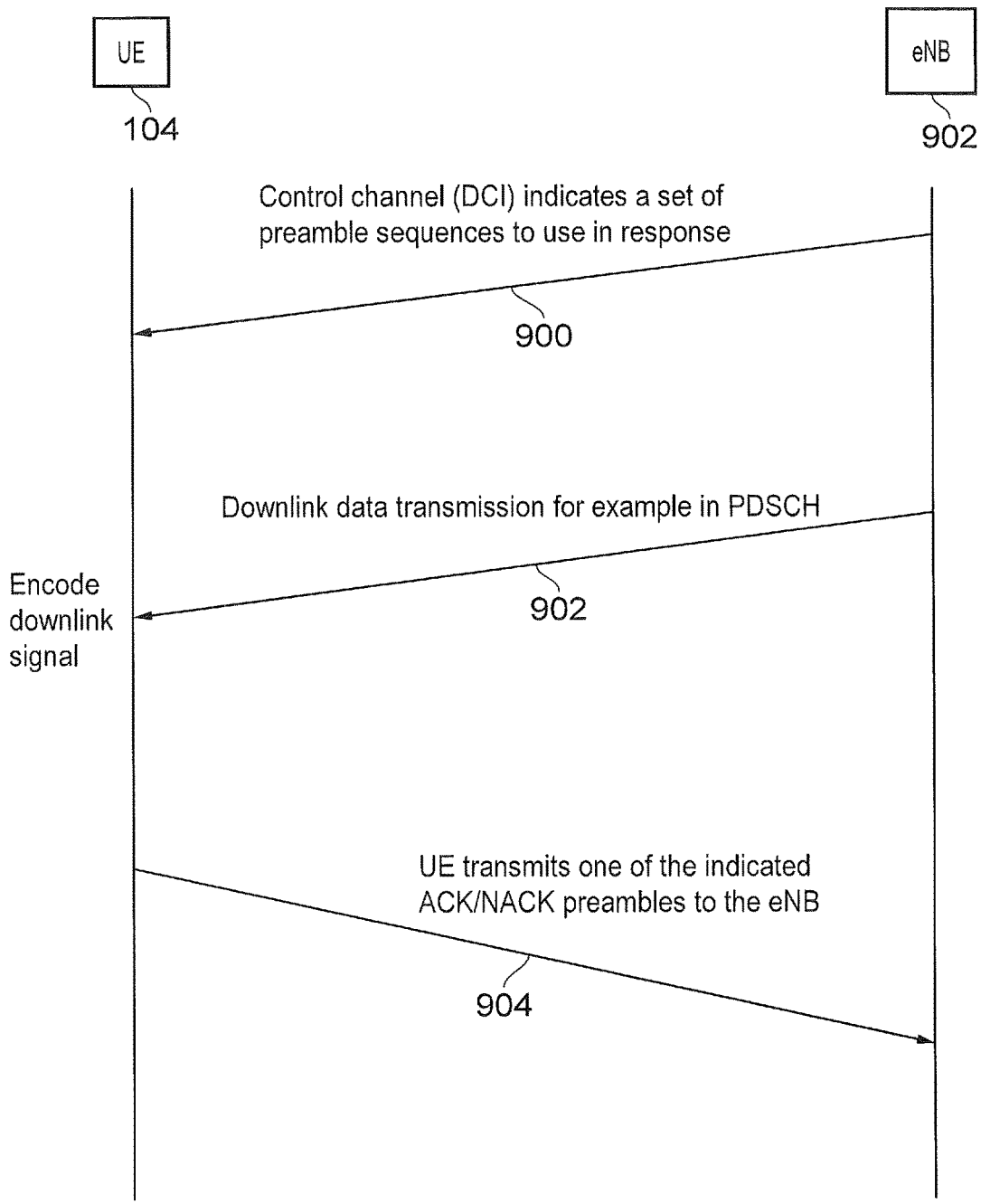
FIG. 11 is a message flow diagram illustrating an arrangement in which an ACK/NACK preamble is transmitted by a communications device in an "inactive-connected" state in response to a downlink data transmission from a base station.

An example implementation is shown in FIG. 11, where the base station firstly transmits a DCI via a control channel such as PDCCH to a UE. The DCI contains scheduling information of the downlink data channel (e.g. PDSCH) and also scheduling information of the corresponding uplink feedback (i.e. time and frequency resources: TFR1). In addition to the scheduling information, the DCI also contains a set of preamble sequences. In this example, the set contains two preamble sequences, one for ACK and another for NACK. The base station then transmits the corresponding downlink data channel using the indicated resources. The UE encodes the downlink signal and determines whether it has received it correctly by performing a CRC check. It then selects one of the preamble sequences representing the outcome of the CRC check and transmits this selected preamble sequence using the appropriate time and frequency resources (labelled TFR1 in the above text).

FIG. 11 represents a message flow diagram in which an eNodeB provides information to the UE 104 of preambles and a location of communications resources in which the UE 104 should transmit its preamble. As represented by a first message 900, an eNodeB 902 which is transmitting to the UE 104 includes in the downlink control information (DCI) an indication of a set of preamble sequences which are to be used in response to transmitting data. Alternatively the set of preamble sequences to be used in the response can be transmitted as part of the downlink data transmission 902 to the UE 104, for example in the PDSCH. The UE 104 recovers the encoded downlink signal, detects the DCI message 900 and transmits one of the preambles indicating an ACK or NACK in the resources indicated by the eNodeB 902 in the downlink control information as represented by an arrow 904. Accordingly, a more efficient use of communications resources is provided, because an amount of signalling which is required particularly where an UE has roamed outside a coverage area from its base eNodeB can be reduced.

In another embodiment, the preamble also indicates whether UE has uplink data to transmit, for example by adopting different preamble sequences and/or different time/frequency resources. Once the base station receives this indication that the UE has uplink data to transmit to the base station, the base station can for example:

allocate an uplink grant for RRC establishment/re-establishment if necessary,
    downlink grant for RRC reconfiguration if necessary,
    uplink grant for data transmission and updated time advance alignment (this timing advance alignment can be determined by the base station on the basis of the timing of the received preamble sequences).

Various further aspects and features of the present invention are defined in the following numbered paragraphs:

Paragraph 1. An infrastructure equipment for forming part of a radio access network of a wireless communications network, the infrastructure equipment comprising
        a transmitter configured to transmit signals to one or more communications devices via a wireless access interface,
        a receiver configured to receive signals from the one or more communications devices via the wireless access interface, an inter-connecting interface for communicating with one or more other infrastructure equipment forming the radio access network of the wireless communications network, and a controller configured with the transmitter to transmit a radio network identifier to a communications device, which is allocated by the infrastructure equipment for identifying the communications device when allocating communications resources of the wireless access interface for transmitting downlink data to the communications device, and after the communications device has entered an inactive connected state, in which the communications device monitors for signals transmitted from the infrastructure equipment, to transmit control signals including the radio network identifier for allocating communications resources of the wireless access interface for the communications device to receive downlink data, to determine whether the communications device is still within a radio coverage area for transmitting signals to and receiving signals from the infrastructure equipment, and if the communications device has left the coverage area, to transmit an indication to the one or more other infrastructure equipment forming part of the radio access network via the inter-connecting interface to trigger a process for transmitting downlink data to the communications device from the one or more other infrastructure equipment.

Paragraph 2. An infrastructure equipment according to paragraph 1, wherein the controller is configured in combination with the transmitter and the receiver to determine whether the communications device is still within the radio coverage area of the infrastructure equipment by transmitting the control signals to the communications device, which include the radio network identifier for allocating downlink communications resources to the communications device for receiving the downlink data from the infrastructure equipment, and if the infrastructure equipment does not receive a response to the control signals from the communications device, determining that the communications device has left the coverage area of the infrastructure equipment.

Paragraph 3. An infrastructure equipment according to paragraph 2, wherein the controller is configured in combination with the transmitter and the receiver to determine that the communications device has left the radio coverage area, if the infrastructure equipment does not receive a response to the control signals from the communications device within a predetermined time.

Paragraph 4. An infrastructure equipment according to paragraph 3, wherein the controller is configured in combination with the transmitter and the receiver to determine that the communications device has left the radio coverage area, if the infrastructure equipment does not receive a response to the control signals from the communications device after the infrastructure equipment has transmitted the control signals a predetermined number of times without receiving a response from the communications device.

Paragraph 5. An infrastructure equipment according to any of paragraphs 1 to 4, wherein the process for transmitting downlink data to the communications device from the one or more other infrastructure equipment includes transmitting a paging radio network identifier from the one or more other infrastructure equipment.

Paragraph 6. An infrastructure equipment according to any of paragraphs 1 to 4, wherein infrastructure equipment and the one or more other infrastructure equipment to which the infrastructure equipment is connected via the inter-connecting interface form a local tracking area, and the process for transmitting downlink data to the communications device from the one or more other communications devices includes transmitting a local tracking area identifier from the one or more other infrastructure equipment.

Paragraph 7. An infrastructure equipment according to paragraph 6, wherein the local tracking area identifier is formed from the radio network identifier allocated by the infrastructure equipment.

Paragraph 8. A radio access network of a wireless communications network, the radio access network comprising a plurality of infrastructure equipment, each of the infrastructure equipment comprising a transmitter configured to transmit signals to one or more communications devices via a wireless access interface, a receiver configured to receive signals from the one or more communications devices via the wireless access interface, the infrastructure equipment forming, with the wireless access interface, a radio access network, an inter-connecting interface for communicating with the others of the plurality of infrastructure equipment forming the radio access network of the wireless communications network, and a controller configured to control the transmitter and the receiver, wherein a first of the infrastructure equipment is configured to transmit a radio network identifier to a communications device, which is allocated by the first infrastructure equipment for identifying the communications device when allocating communications resources of the wireless access interface for transmitting downlink data to the infrastructure equipment, and after the communications device has entered an inactive connected state, in which the communications device monitors for signals transmitted from the first infrastructure equipment or others of the plurality of infrastructure equipment, to determine whether the communications device is still within a radio coverage area for transmitting signals to and receiving signals from the first infrastructure equipment, and if the communications device has left the coverage area of the first infrastructure equipment, to trigger a process for transmitting downlink data to the communications device from the one or more other infrastructure equipment.

Paragraph 9. An infrastructure equipment for forming part of a radio access network of a wireless communications network, the infrastructure equipment comprising a transmitter configured to transmit signals to one or more communications devices via a wireless access interface, a receiver configured to receive signals from the one or more communications devices via the wireless access interface, the infrastructure equipment forming, with the wireless access interface, a radio access network, and a controller configured with the transmitter
  to transmit a radio network identifier to a communications device, which is allocated by the infrastructure equipment for identifying the communications device when allocating communications resources of the wireless access interface for transmitting downlink data from the infrastructure equipment, and
  to transmit to the communications device one or both of:
    an indication of an acknowledgement preamble for use by the communications device in an inactive-connected state to indicate an acknowledgement of a received downlink data transmission, or
    an indication of a negative acknowledgement preamble for use by the communications device in an inactive-connected state to indicate a negative acknowledgement if a downlink data transmission is not received.

Paragraph 10. An infrastructure equipment according to paragraph 9, wherein the controller is configured in combination with the transmitter and the receiver
  to transmit a downlink data unit to the communications device, and
  to monitor for reception of an acknowledgement preamble acknowledging receipt of the downlink data unit by the communications device, or
  to monitor for reception of a negative acknowledgement preamble indicating that the downlink data unit was not received correctly by the communications device.

Paragraph 11. An infrastructure equipment according to paragraph 10, wherein the controller is configured with the transmitter and the receiver
  to determine a relative time of arrival of a received acknowledgement preamble or negative acknowledgement preamble and power level, and
  to transmit to the communications device from which the acknowledgement preamble or negative acknowledgement preamble was received a subsequent message to correct the timing and power level of subsequent transmissions by the communications device preamble.

Paragraph 12. An infrastructure equipment according to paragraph 10 or 11, wherein the controller is configured in combination with the transmitter and the receiver to detect that the communications device has left a radio coverage area for transmitting signals to and receiving signals from the infrastructure equipment, if the receiver does not receive an acknowledgement preamble or a negative acknowledgement preamble in response to transmitting downlink data to the communications device.

Paragraph 13. An infrastructure equipment according to paragraph 12, comprising an inter-connecting interface for communicating with one or more other infrastructure equipment forming a radio access network of the wireless communications network, wherein controller is configured to trigger a process for transmitting the downlink data to the communications device from one of the other infrastructure equipment via the inter-connecting interface, if the receiver does not receive an acknowledgement preamble or a negative acknowledgement preamble in response to transmitting downlink data to the communications device.

Paragraph 14. A communications device for transmitting data to or receiving data from a wireless communications network, the communications device comprising
  a transmitter configured to transmit signals to one or more infrastructure equipment of the wireless communications network via a wireless access interface,
  a receiver configured to receive signals from one or more of the infrastructure equipment of the wireless communications network via the wireless access interface, the one or more infrastructure equipment forming, with the wireless access interface, a radio access network for transmitting data to and receiving the data from the communications device, and a controller configured with the receiver
  to receive, from a first of the one or more infrastructure equipment, a radio network identifier allocated for identifying the communications device when allocating communications resources of the wireless access interface for transmitting data to or receiving data from the infrastructure equipment, and
  to control the transmitter and the receiver to enter an inactive connected state in which the receiver monitors signals representing downlink data transmitted from the first infrastructure equipment, the signals including the radio network identifier allocated by the first infrastructure equipment and to monitor signals transmitted from one or more other infrastructure equipment for determining whether the communications device should select a second of the one or more infrastructure equipment for receiving downlink data from the second of the one or more infrastructure equipment.

Paragraph 15. A communications device according to paragraph 14, wherein the controller is configured with the receiver subsequently
  to receive an allocation of communications resources for receiving data from the first infrastructure equipment using the radio network identifier.

Paragraph 16. A communications device according to paragraph 14 or 15, wherein the controller is configured with the receiver, after determining that the communications device should transmit signals to and receive signals from a second of the one or more infrastructure equipment
  to receive signals from the second infrastructure equipment, and
  to detect from the received signals a second identifier, which identifies the communications device for receiving data from the second infrastructure equipment.

Paragraph 17. A communications device according to paragraph 16, wherein the second identifier is a paging radio network identifier, which has been allocated to the communications device for receiving the signals from the second infrastructure equipment.

Paragraph 18. A communications device according to any of paragraphs 14 to 17, wherein, the controller is configured to retain the radio network identifier allocated by the first infrastructure equipment for receiving an allocation of communications resources from the first infrastructure equipment.

Paragraph 19. A communications device according to any of paragraphs 16, 17 or 18, wherein the second identifier is a local tracking area identifier allocated to the communications device by the first infrastructure equipment, which identifies the communications device for the communications device to determine an allocation of communications resource from the second infrastructure equipment and one or more other infrastructure equipment within an area determined by the wireless communications network.

Paragraph 20. A communications device according to any of paragraphs 14 to 19, wherein the second identifier is formed from a combination of the radio network identifier allocated by the first infrastructure equipment and a code identifying the communications device within a predetermined number of one or more neighbouring infrastructure equipment.

Paragraph 21. A communications device for transmitting data to or receiving data from a wireless communications network, the communications device comprising a transmitter configured to transmit signals to one or more infrastructure equipment of the wireless communications network via a wireless access interface, a receiver configured to receive signals from one or more of the infrastructure equipment of the wireless communications network via the wireless access interface, the one or more infrastructure equipment forming with the wireless access interface a radio access network, and a controller configured with the receiver to receive, from a first of the one or more infrastructure equipment, a radio network identifier allocated for identifying the communications device when allocating communications resources of the wireless access interface for transmitting data to or receiving data from the infrastructure equipment, to receive one or both of an indication of an acknowledgement preamble indicating an acknowledgement of a received data transmission when the communications device is in an inactive-connected state, or an indication of a negative acknowledgement preamble indicating a negative acknowledgement if a data transmission is not received when the communications device is in an inactive-connected state, to control the transmitter and the receiver to enter the inactive connected state in which the receiver monitors signals representing downlink data transmitted from the first infrastructure equipment and one or more other infrastructure equipment to determine whether the communications device should select one of the other infrastructure equipment or the first infrastructure equipment from which the communications device should receive the downlink data, and to transmit the acknowledgement preamble or the negative acknowledgement preamble after receiving control signals which include an identifier of the communication device.

Paragraph 22. A communications device according to paragraph 21, wherein the controller is configured in combination with the receiver to receive the indication of one or both of the acknowledgement preamble or the negative acknowledgement preamble from the first infrastructure equipment when the communications device enters the connected idle state.

REFERENCES

[1] LTE for UMTS: OFDMA and SC-FDMA Based Radio Access, Harris Holma and Antti Toskala, Wiley 2009, ISBN 978-0-470-99401-6.
[2] 3GPP TS 36.321
[3] "Signalling reduction to enable light connection for LTE" (link: RP-160540)
[4] "Evaluation on RAN initiated paging and MME initiated paging" 3GPP TSG-RAN WG2 Meeting #94 R2-163930 Nanjing, China, 23-27 May 2016
[5] 3GPP TSG-RAN WG2 #94 Tdoc R2-163998 Nanjing, P. R. China, 23-27 May 2016
[6] 3GPP TSG RAN WG2 Meeting #94 R2-163582 Nanjing, China, 23-27 May 2016

ANNEX 1

Figure 12:
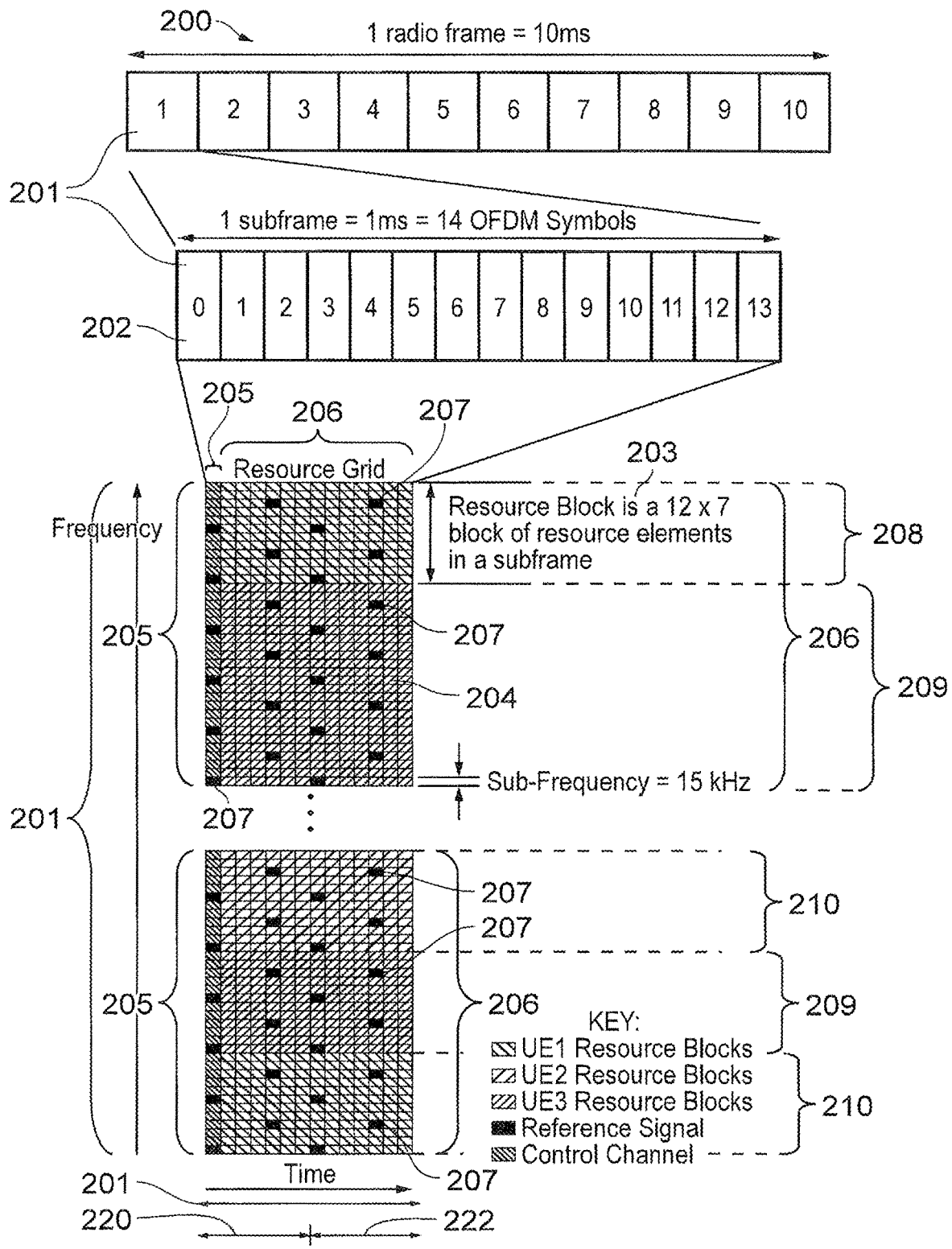
FIG. 12 is a schematic representation of a structure of a downlink frame according to an LTE standard.
Figure 13:
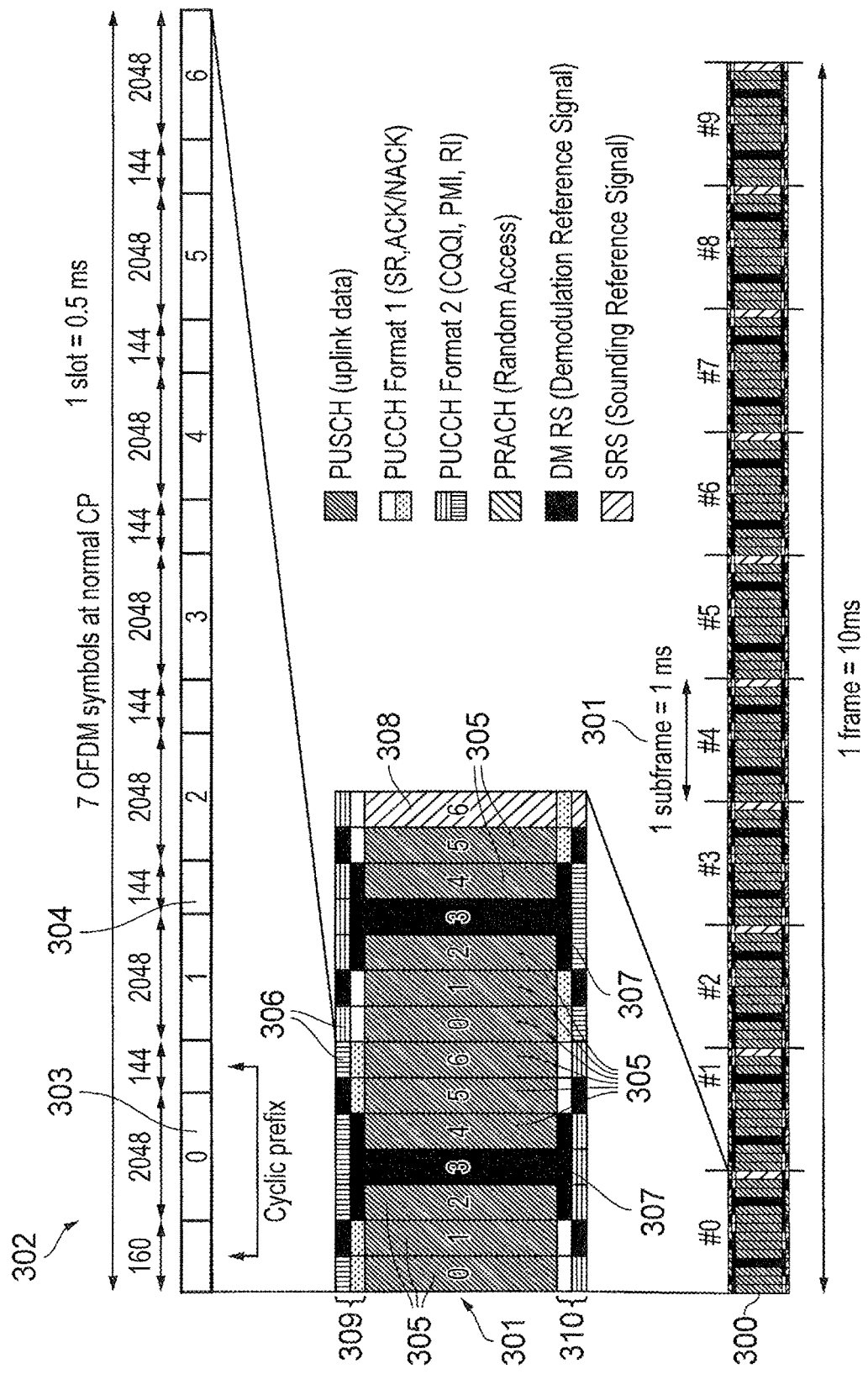
FIG. 13 is a schematic representation of a structure of an uplink frame according to an LTE standard.

The down-link and the up-link of a wireless access interface according to an LTE standard is presented in FIGS. 12 and 13.

FIG. 12 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used for features such as the cyclic prefix of the OFDM symbols). The number of subcarriers varies between 72 subcarriers (1.4 MHz) and 1200 subcarriers (20 MHz). In some examples the subcarriers are grouped on a basis of $2^{th}$, for example 128 to 2048, so that both a transmitter and a receiver can use an inverse and a forward Fast Fourier Transform to convert the subcarriers from the frequency domain to the time domain and from the time domain to the frequency domain respectively. Each subcarrier bandwidth may take any value but in LTE it is fixed at 15 kHz.

As shown in FIG. 12, the resources of the wireless access interface are also temporally divided into frames where a frame 200 lasts 10 ms and is subdivided into 10 sub-frames 201 each within a duration of 1 ms. Each sub-frame 201 is formed from 14 OFDM symbols and is divided into two slots 1220, 1222 each of which comprise six or seven OFDM symbols depending on whether a normal or extended cyclic prefix is being utilised between OFDM symbols for the reduction of inter symbol interference. The resources within a slot may be divided into resources blocks 1203 each comprising 12 subcarriers for the duration of one slot and the resources blocks further divided into resource elements 1204 which span one subcarrier for one OFDM symbol, where each rectangle 1204 represents a resource element. The resource elements distributed in time within a sub-frame and frequency across the host system band width represent the communications resources of the host system.

The simplified structure of the downlink of an LTE wireless access interface presented in FIG. 12, also includes an illustration of each sub-frame 1201, which comprises a control region 1205 for the transmission of control data, a data region 1206 for the transmission of user data, reference signals 1207 and synchronisation signals which are interspersed in the control and data regions in accordance with a predetermined pattern. The control region 1204 may contain a number of physical channels for the transmission of control data, such as a physical downlink control channel (PDCCH), a physical control format indicator channel (PCFICH) and a physical HARQ indicator channel (PHICH).

The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure ePDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it had previously requested or data which is being pushed to it by the eNodeB, such as radio resource control (RRC) signalling. In FIG. 3, UE1 has been allocated resources 1208 of the data region 1206, UE2 resources 1209 and UE3 resources 1210. UEs in an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same sub-frame.

FIG. 13 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. The simplified structure of FIG. 4 illustrates such an uplink frame in an FDD implementation. A frame 1300 is divided in to 10 sub-frames 1301 of 1 ms duration where each sub-frame 1301 comprises two slots 1302 of 0.5 ms duration. Each slot is then formed from seven OFDM symbols 1303 where a cyclic prefix 1304 is inserted between each symbol in a manner equivalent to that in downlink sub-frames.

As shown in FIG. 13, each LTE uplink sub-frame may include a plurality of different channels, for example a physical uplink communications channel (PUSCH) 1305, a physical uplink control channel (PUCCH) 1306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink sub-frames may also include reference signals. For example, demodulation reference signals (DMRS) 1307 and sounding reference signals (SRS) 1308 may be present in an uplink sub-frame where the DMRS occupy the fourth symbol of a slot in which PUSCH is transmitted and are used for decoding of PUCCH and PUSCH data, and where SRS are used for uplink channel estimation at the eNodeB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink sub-frames, uplink sub-frames have a different control structure to downlink sub-frames, in particular the upper 309 and lower 310 subcarriers/frequencies/resource blocks of an uplink sub-frame are reserved for control signaling rather than the initial symbols of a downlink sub-frame. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made contiguous frequency allocations for each UE are preferable.

The invention claimed is:

1. A communications device for transmitting data to or receiving data from a wireless communications network, the communications device comprising:
a transmitter configured to transmit signals to one or more infrastructure equipment of the wireless communications network via a wireless access interface;
a receiver configured to receive signals from one or more of the infrastructure equipment of the wireless communications network via the wireless access interface, the one or more infrastructure equipment forming, with the wireless access interface, a radio access network for transmitting data to and receiving the data from the communications device; and
a controller configured with the transmitter and the receiver to
receive, from a first of the one or more infrastructure equipment, a radio network identifier allocated for identifying the communications device when allocating communications resources of the wireless access interface for transmitting data to or receiving data from the infrastructure equipment, and
control the transmitter and the receiver to enter an inactive connected state in which the receiver monitors signals representing downlink data transmitted from the first infrastructure equipment, the signals including the radio network identifier allocated by the first infrastructure equipment and to monitor signals transmitted from one or more other infrastructure equipment for determining whether the communications device should select a second of the one or more infrastructure equipment for receiving downlink data from the second of the one or more infrastructure equipment,
in response to the communications device leaving a radio coverage area for transmitting signals to and receiving signals from the infrastructure equipment, receive downlink data from the one or more other infrastructure equipment,
wherein the communications device has left the radio coverage area when the infrastructure equipment has transmitted control signals a predetermined number of times without receiving a response from the communications device.

2. The communications device as claimed in claim 1, wherein the controller is configured with the receiver subsequently
to receive an allocation of communications resources for receiving data from the first infrastructure equipment using the radio network identifier.

3. The communications device as claimed in claim 2, wherein the controller is configured with the receiver, after determining that the communications device should transmit signals to and receive signals from a second of the one or more infrastructure equipment
to receive signals from the second infrastructure equipment, and
to detect from the received signals a second identifier, which identifies the communications device for receiving data from the second infrastructure equipment.

4. The communications device as claimed in claim 3, wherein the second identifier is a paging radio network identifier, which has been allocated to the communications device for receiving the signals from the second infrastructure equipment.

5. The communications device as claimed in claim 4, wherein, the controller is configured to retain the radio network identifier allocated by the first infrastructure equipment for receiving an allocation of communications resources from the first infrastructure equipment.

6. The communications device as claimed in claim 5, wherein the second identifier is a local tracking area identifier allocated to the communications device by the first infrastructure equipment, which identifies the communications device for the communications device to determine an allocation of communications resource from the second infrastructure equipment and one or more other infrastructure equipment within an area determined by the wireless communications network.

7. The communications device as claimed in claim 6, wherein the second identifier is formed from a combination of the radio network identifier allocated by the first infrastructure equipment and a code identifying the communications device within a predetermined number of one or more neighboring infrastructure equipment.

8. A method of receiving data at a communications device, the method comprising:
transmitting, by a transmitter, signals to one or more infrastructure equipment of the wireless communications network via a wireless access interface;
receiving, from a first of one or more infrastructure equipment, a radio network identifier allocated for identifying the communications device when allocating communications resources of wireless access interface for transmitting data to or receiving data from the infrastructure equipment, the one or more infrastructure equipment forming, with the wireless access interface, a radio access network for transmitting data to and receiving the data from the communications device;
entering an inactive connected state in which the receiver monitors signals representing downlink data transmitted from the first infrastructure equipment, the signals including the radio network identifier allocated by the first infrastructure equipment;
monitoring signals transmitted from one or more other infrastructure equipment for determining whether the communications device should select a second of the one or more infrastructure equipment for receiving downlink data from the second of the one or more infrastructure equipment; and
in response to the communications device leaving a radio coverage area for transmitting signals to and receiving signals from the infrastructure equipment, receiving downlink data from the one or more other infrastructure equipment,
wherein the communications device has left the radio coverage area when the infrastructure equipment has transmitted control signals to the communications device a predetermined number of times without receiving a response from the communications device.

9. The method as claimed in claim 8, comprising
receiving an allocation of communications resources for receiving data from the first infrastructure equipment using the radio network identifier.

10. The method as claimed in claim 9, comprising, after determining that the communications device should transmit signals to and receive signals from a second of the one or more infrastructure equipment
receiving signals from the second infrastructure equipment, and
detecting from the received signals a second identifier, which identifies the communications device for receiving data from the second infrastructure equipment.

* * * * *